United States Patent
Park et al.

(10) Patent No.: US 9,497,741 B2
(45) Date of Patent: Nov. 15, 2016

(54) METHOD AND APPARATUS FOR TRANSMITTING AND RECEIVING UPLINK CONTROL INFORMATION IN RADIO ACCESS SYSTEM

(71) Applicant: LG ELECTRONICS INC., Seoul (KR)

(72) Inventors: Kyujin Park, Anyang-si (KR); Hangyu Cho, Anyang-si (KR); Seunghee Han, Anyang-si (KR); Hyeyoung Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 14/346,589

(22) PCT Filed: Sep. 26, 2012

(86) PCT No.: PCT/KR2012/007760
§ 371 (c)(1),
(2) Date: Mar. 21, 2014

(87) PCT Pub. No.: WO2013/048114
PCT Pub. Date: Apr. 4, 2013

(65) Prior Publication Data
US 2014/0241298 A1 Aug. 28, 2014

Related U.S. Application Data

(60) Provisional application No. 61/538,941, filed on Sep. 26, 2011.

(51) Int. Cl.
*H04L 5/00* (2006.01)
*H04W 72/04* (2009.01)
(Continued)

(52) U.S. Cl.
CPC ........ *H04W 72/0413* (2013.01); *H04L 1/0077* (2013.01); *H04L 1/1854* (2013.01);
(Continued)

(58) Field of Classification Search
None
See application file for complete search history.

(56) References Cited

U.S. PATENT DOCUMENTS 8,811,324 B2 * 8/2014 Zhu ............... H04W 52/325
370/280
9,014,063 B2 * 4/2015 Lee ............... H04L 1/1861
370/280

(Continued)

FOREIGN PATENT DOCUMENTS

KR 10-2011-0093725 A 8/2011

OTHER PUBLICATIONS

"Evolved Universal Terrestrial Radio Access (E-UTRA) Physical Layer Procedures", ETSI TS 136 213 v8.8.0, 3GPP TS 36.213 version 8.8.0 release 8 Technical Specification, Oct. 2009.*

(Continued)

*Primary Examiner* — Jeffrey M Rutkowski
*Assistant Examiner* — Jonathan B Wood
(74) *Attorney, Agent, or Firm* — Dentons US LLP

(57) ABSTRACT

A method and apparatus for transmitting and receiving uplink control information (UCI) in a radio access system supporting an enhanced physical downlink control channel (e-PDCCH) is disclosed. The method includes transmitting downlink control information (DCI) including offset information for determining resources for transmitting a physical uplink control channel (PUCCH) via the e-PDCCH, and receiving the UCI using uplink resources according to a resource index value for transmitting the PUCCH. The resource index value is calculated using an index value of a control channel element (CCE) comprising the e-PDCCH and the offset information.

20 Claims, 22 Drawing Sheets

(51) Int. Cl.
*H04L 25/03* (2006.01)
*H04L 1/00* (2006.01)
*H04L 1/18* (2006.01)

(52) U.S. Cl.
CPC ............ *H04L1/1861* (2013.01); *H04L 5/001* (2013.01); *H04L 5/0048* (2013.01); *H04L 5/0055* (2013.01); *H04L 25/03929* (2013.01); *H04W 72/042* (2013.01); *H04L 5/0053* (2013.01)

(56) References Cited

U.S. PATENT DOCUMENTS

| | | | |
|---|---|---|---|
| 2011/0064115 A1* | 3/2011 | Xu et al. | 375/130 |
| 2011/0103307 A1* | 5/2011 | Kim et al. | 370/328 |
| 2011/0243007 A1* | 10/2011 | Xiao | 370/252 |
| 2011/0243066 A1* | 10/2011 | Nayeb Nazar et al. | 370/328 |
| 2011/0243088 A1* | 10/2011 | Ahn ............ H04L 1/0023 | 370/329 |
| 2011/0280203 A1* | 11/2011 | Han ............ H04L 1/0031 | 370/329 |
| 2011/0310761 A1* | 12/2011 | Lee et al. | 370/252 |
| 2011/0317596 A1* | 12/2011 | Jongren et al. | 370/280 |
| 2012/0113831 A1* | 5/2012 | Pelletier et al. | 370/252 |
| 2012/0113907 A1* | 5/2012 | Baldemair ...... H04W 52/146 | 370/329 |
| 2012/0127950 A1* | 5/2012 | Chung ............ H04L 5/0055 | 370/329 |
| 2012/0140689 A1* | 6/2012 | Pelletier et al. | 370/311 |
| 2012/0176884 A1* | 7/2012 | Zhang ............ H04B 7/024 | 370/203 |
| 2012/0213163 A1* | 8/2012 | Lee et al. | 370/329 |
| 2012/0236767 A1* | 9/2012 | Zhu ............ H04W 52/325 | 370/280 |
| 2012/0294204 A1* | 11/2012 | Chen et al. | 370/280 |
| 2012/0320847 A1* | 12/2012 | Nam et al. | 370/329 |
| 2012/0320848 A1* | 12/2012 | Chen et al. | 370/329 |
| 2013/0028214 A1* | 1/2013 | Imamura et al. | 370/329 |
| 2013/0039284 A1* | 2/2013 | Marinier et al. | 370/329 |
| 2013/0100833 A1* | 4/2013 | Xu et al. | 370/252 |
| 2013/0265946 A1* | 10/2013 | Gao ............ H04L 1/1854 | 370/329 |
| 2014/0198765 A1* | 7/2014 | Krishnamurthy et al. | 370/330 |

OTHER PUBLICATIONS

LG Electronics, "Discussion about UCI transmission enhancement", 3GPP TSG RAN WG1 Meeting #66, R1-112482, Aug. 22-26, 2011.

Samsung, "Discussion on UCI transmission enhancements in Rel-11", 3GPP TSG RAN WG1 Meeting #66, R1-112522, Aug. 22-26, 2011.

Intel Corporation, "Discussions of UCI-only Transmission on PUSCH", 3GPP TSG RAN WG1 Meeting #66, R1-112232, Aug. 22-26, 2011.

* cited by examiner

FIG. 6
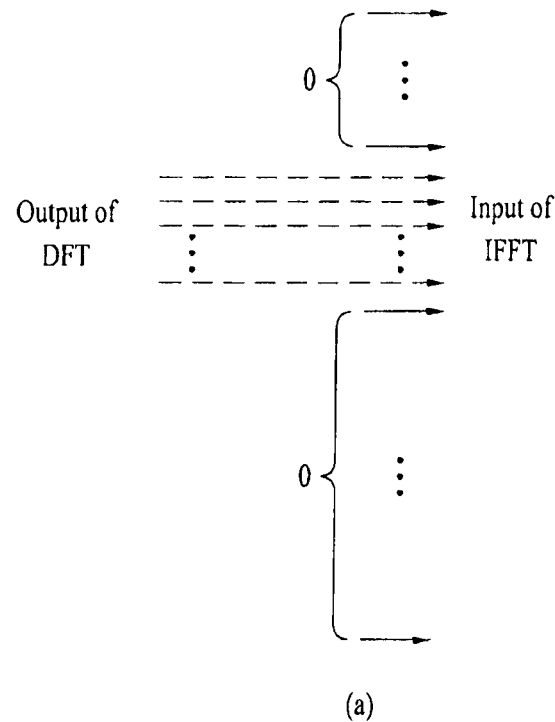
(a)
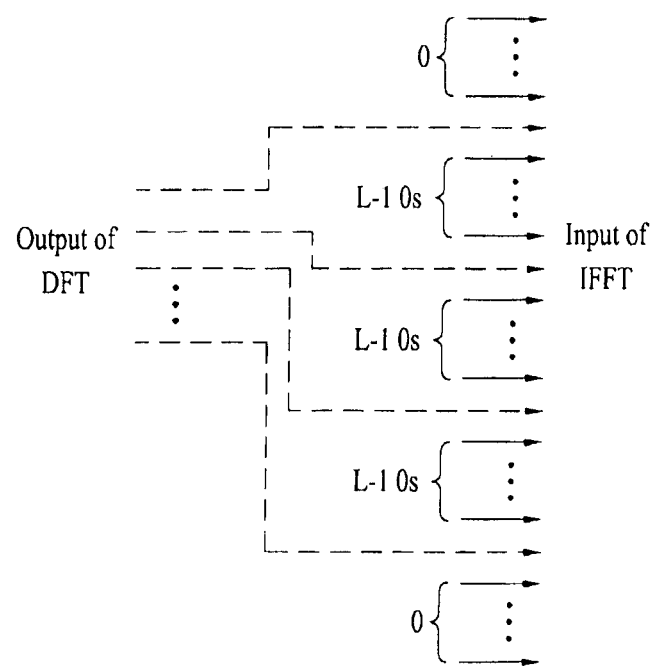
(b)

FIG. 13
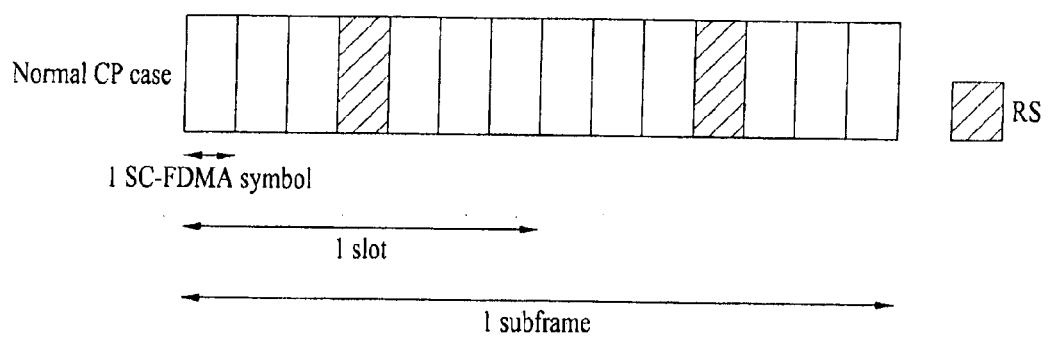
(a)
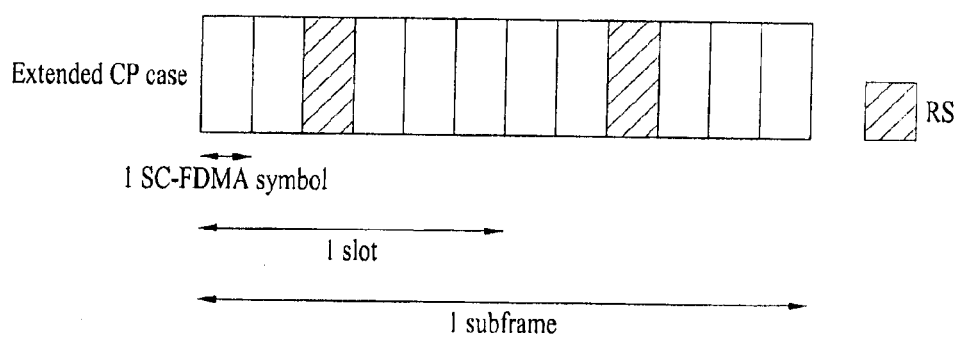
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 18

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | 12 | n' = 0 | | 12 |
| 2 | 1 | | 6 | 13 | | 6 | 13 |
| 3 | 2 | 1 | 7 | 14 | 1 | 7 | 14 |
| 4 | 3 | 2 | 8 | 15 | 2 | 8 | 15 |
| 5 | 4 | 3 | 9 | 16 | 3 | 9 | 16 |
| 6 | 5 | 4 | 10 | 17 | 4 | 10 | 17 |
| 7 | 6 | 5 | 11 | | 5 | 11 | |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \{\{1,2,3\}$ for normal cyclic prefix
$\{1,2,3\}$ for extended cyclic prefix $\delta_{offset}^{PUCCH} \in \{0,1,...,\Delta_{shift}^{PUCCH} - 1\}$ Cell specific cyclic shift offset $n_{OC}$     Orthogonal sequence index for ACK/NACK
$\bar{n}_{OC}$     Orthogonal sequence index for RS
$n_{CS}$     Cyclic shift value of a CAZAC sequence
n'     ACK/NACK resource index used for the channelization in a RB Cell-specific Cyclic shift value of CAZAC sequence ମETHOD AND APPARATUS FOR TRANSMITTING AND RECEIVING UPLINK CONTROL INFORMATION IN RADIO ACCESS SYSTEM This application is a 35 USC §371 National Stage entry of International Application No. PCT/KR2012/007760 filed on Sep. 26, 2012, and claims priority to U.S. Provisional Application No. 61/538,941, filed Sep. 26, 2011, all of which are incorporated by reference in their entirety herein.

TECHNICAL FIELD

The present invention relates to a radio access system, and more particularly, to a method and apparatus for transmitting and receiving uplink control information in radio access system supporting an enhanced physical downlink control channel.

BACKGROUND ART

A mobile communication system has developed in order to provide a voice service while ensuring user activity. The mobile communication system has gradually extended to a data service in addition to the voice service and has currently developed to the extent of providing a high-speed data service. However, in a mobile communication system which currently provides a service, a more improved mobile communication system has been required due to resource lack or a user demand for a higher-speed service.

One of most important requirements of a next-generation radio access system is to support requirement of a data transfer rate. In order to support requirement of a data transfer rate, various techniques such as multiple input multiple output (MIMO), cooperative multiple point transmission (CoMP), carrier aggregation (CA)/multiple cells, relay, etc. have been studied.

Such techniques have a difficulty in equally utilizing a downlink control channel used in the existing system, in order to obtain maximum performance. In a 3GPP LTE-A system, an enhanced physical downlink control channel (e-PDCCH) has been introduced in order to increase capacity of a PDCCH in a 3GPP LTE system.

DISCLOSURE

Technical Problem

An object of the present invention devised to solve the problem lies on a method and apparatus for transmitting and receiving efficiently uplink control information between a user equipment (UE) and a base station (BS) in a radio access system supporting an enhanced physical downlink control channel (e-PDCCH).

Another object of the present invention devised to solve the problem lies on a method and apparatus for preventing collision of resources for transmitting uplink control information between a UE which receives the legacy PDCCH and a UE which receives an enhanced PDCCH (e-PDCCH) in a radio access system supporting the e-PDCCH.

The technical problems solved by the present invention are not limited to the above technical problems and other technical problems which are not described herein will become apparent to those skilled in the art from the following description.

Technical Solution

The object of the present invention can be achieved by providing a method of receiving uplink control information (UCI) in a radio access system supporting an enhanced physical downlink control channel (e-PDCCH) transmitted in a state of being multiplexed with a physical downlink shared channel (PDSCH), including transmitting downlink control information (DCI) including offset information for determining resources for transmitting a physical uplink control channel (PUCCH) via the e-PDCCH, and receiving the UCI using uplink resources according to a resource index value for transmitting the PUCCH, wherein the resource index value is calculated using an index value of a control channel element (CCE) comprising the e-PDCCH and the offset information.

In another aspect of the present invention, provided herein is a base station for receiving uplink control information (UCI) in a radio access system supporting an enhanced physical downlink control channel (e-PDCCH) transmitted in a state of being multiplexed with a physical downlink shared channel (PDSCH), including a radio frequency (RF) unit configured to transmit and receive a radio signal, and a processor configured to transmit downlink control information (DCI) including offset information for determining resources for transmitting a physical uplink control channel (PUCCH) via the e-PDCCH and to receive the UCI using uplink resources according to a resource index value for transmitting the PUCCH, wherein the resource index value is calculated using an index values of a control channel elements (CCE) comprising the e-PDCCH and the offset information.

The resource index value may be calculated by applying an offset value mapped to the offset information to a PUCCH resource mapping function in a predetermined table.

The DCI may include a PUCCH resource offset value field and the offset information may be indicated via the PUCCH resource offset value field.

The DCI may include a transmission power control (TPC) command field and the offset information may be indicated via the TPC command field.

The index value of the CCE comprising the e-PDCCH may be a smallest CCE index value or a largest CCE index value among CCEs comprising the e-PDCCH.

The uplink control information may be hybrid automatic repeat and request acknowledgement (HARQ ACK)/negative ACK (NACK).

In a further aspect of the present invention, provided herein is a method of transmitting uplink control information (UCI) in a radio access system supporting an enhanced physical downlink control channel (e-PDCCH) transmitted in a state of being multiplexed with a physical downlink shared channel (PDSCH), including receiving downlink control information (DCI) including offset information for determining resources for transmitting a physical uplink control channel (PUCCH) via the e-PDCCH, calculating a resource index value for transmitting the PUCCH using an index value of a control channel elements (CCE) comprising the e-PDCCH and the offset information, and transmitting the UCI using uplink resources according to the resource index value.

In a further aspect of the present invention, provided herein is a user equipment for transmitting uplink control information (UCI) in a radio access system supporting an enhanced physical downlink control channel (e-PDCCH) transmitted in a state of being multiplexed with a physical downlink shared channel (PDSCH), including a radio frequency (RF) unit configured to transmit and receive a radio signal, and a processor configured to receive downlink control information (DCI) including offset information for determining resources for transmitting a physical uplink control channel (PUCCH) via the e-PDCCH, to calculate a resource index value for transmitting the PUCCH using an index value of a control channel element (CCE) comprising the e-PDCCH and the offset information, and to transmit the UCI using uplink resources according to the resource index value.

The resource index value may be calculated by applying an offset value mapped to the offset information to a PUCCH resource mapping function in a predetermined table.

The DCI may include a PUCCH resource offset value field and the offset information may be indicated via the PUCCH resource offset value field.

The DCI may include a transmission power control (TPC) command field and the offset information may be indicated via the TPC command field.

The index value of the CCE comprising the e-PDCCH may be a smallest CCE index value or a largest CCE index value among CCEs comprising the e-PDCCH.

The uplink control information may be hybrid automatic repeat and request acknowledgement (HARQ ACK)/negative ACK (NACK).

Advantageous Effects

According to embodiments of the present invention, in a radio access system and, more particularly, in a radio access system supporting an enhanced physical downlink control channel (e-PDCCH), it is possible to transmit and receive efficiently uplink control information between a user equipment (UE) and a base station (BS).

According to embodiments of the present invention, it is possible to prevent collision of resources for transmitting uplink control information between a UE which receives the legacy PDCCH and a UE which receives an enhanced PDCCH (e-PDCCH) in a radio access system supporting the e-PDCCH.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings:

FIG. 6 is a diagram explaining a signal mapping scheme in a frequency domain satisfying a single carrier property in a frequency domain.

FIG. 13 is a diagram showing the structure of a subframe for transmitting a demodulation reference signal (DMRS).

FIG. 18 is a diagram explaining ACK/NACK channelization for PUCCH formats 1a and 1b.

BEST MODE

Figure 1:
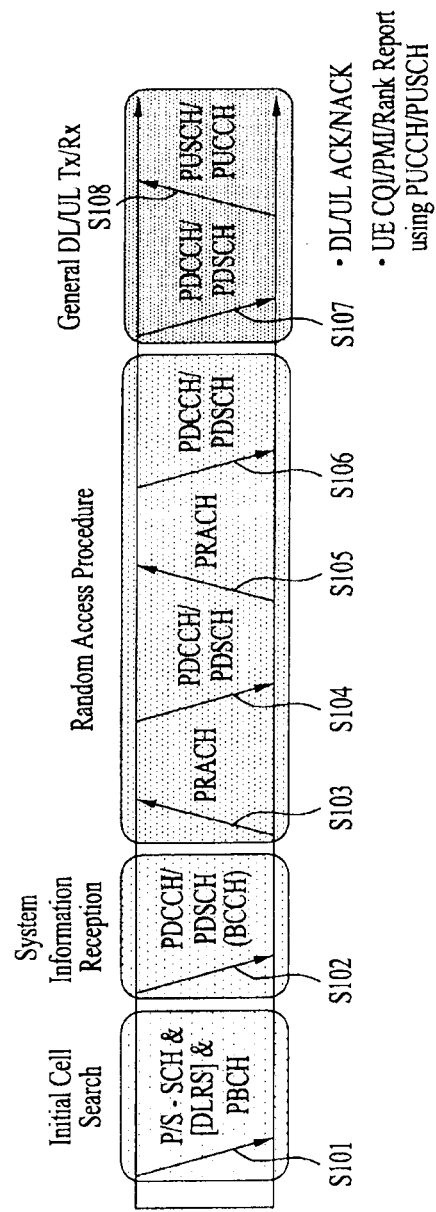
FIG. 1 is a view showing physical channels used for a $3^{rd}$ Generation Partnership Project (3GPP) Long Term Evolution (LTE) system and a general signal transmission method using the same.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters.

In some instances, well-known structures and devices are omitted in order to avoid obscuring the concepts of the present invention and the important functions of the structures and devices are shown in block diagram form.

The embodiments of the present invention are disclosed on the basis of a data communication relationship between a base station and a user equipment. In this case, the base station is used as a terminal node of a network via which the base station can directly communicate with the mobile station. Specific operations to be conducted by the base station in the present invention may also be conducted by an upper node of the base station as necessary. In other words, it will be obvious to those skilled in the art that various operations for enabling the base station to communicate with the mobile station in a network composed of several network nodes including the base station will be conducted by the base station or network nodes other than the base station. The term "Base Station (BS)" may be replaced with the terms fixed station, Node-B, eNode-B (eNB), or access point (AP) as necessary. The term "relay" may be replaced with the term relay node (RN) or relay station (RS). The term "terminal" may also be replaced with the term user equipment (UE), mobile station (MS), mobile subscriber station (MSS) or subscriber station (SS) as necessary.

It should be noted that specific terms disclosed in the present invention are proposed for the convenience of description and better understanding of the present invention, and the use of these specific terms may be changed to another format within the technical scope or spirit of the present invention.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE.

For clarity, the following description focuses on 3GPP LTE and LTE-A. However, the technical spirit of the present invention is not limited thereto.

1. General 3GPP LTE/LTE-A System to which the Present Invention May be Applied 1.1. General System FIG. 1 is a view showing physical channels used for a $3^{rd}$ Generation Partnership Project (3GPP) Long Term Evolution (LTE) system and a general signal transmission method using the same.

When a UE is powered on or when the UE newly enters a cell, the UE performs an initial cell search operation such as synchronization with a BS in step S101. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S102.

Thereafter, the UE may perform a random access procedure in steps S103 to S106, in order to complete the access to the BS. For the random access procedure, the UE may transmit a preamble via a Physical Random Access Channel (PRACH) (S103), and may receive a message in response to the preamble via the PDCCH and the PDSCH corresponding thereto (S104). In contention-based random access, a contention resolution procedure including the transmission of an additional PRACH (S105) and the reception of the PDCCH and the PDSCH corresponding thereto (S106) may be performed.

The UE which performs the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

Figure 2:
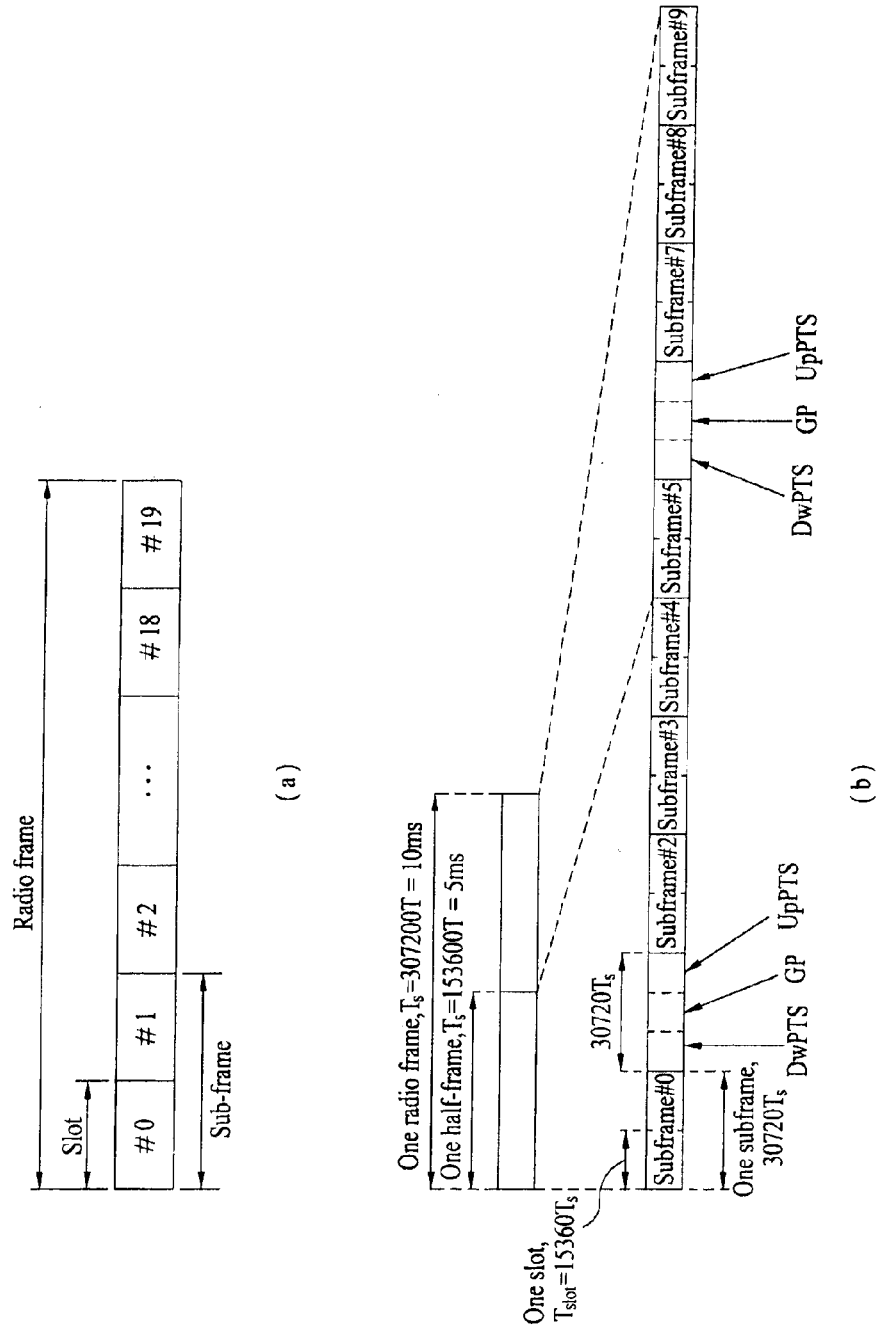
FIG. 2 is a diagram showing the structure of a radio frame used in a 3GPP LTE system.

FIG. 2 is a diagram showing the structure of a radio frame used in a 3GPP LTE system.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD).

FIG. 2(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 2(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

Figure 3:
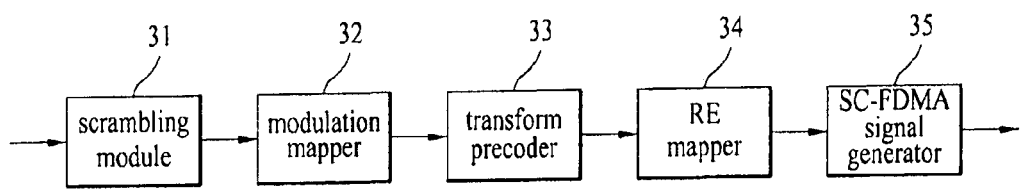
FIG. 3 is a view explaining a signal processing procedure of transmitting an uplink (UL) signal at a UE.

FIG. 3 is a view explaining a signal processing procedure of transmitting an uplink (UL) signal at a UE.

In order to transmit the UL signal, a scrambling module 31 of the UE may scramble a transmitted signal using a UE-specific scrambling signal. The scrambled signal is input to a modulation mapper 32 so as to be modulated into complex symbols by a Binary Phase Shift Keying (BPSK), Quadrature Phase Shift Keying (QPSK), 16-Quadrature amplitude modulation (QAM) or 64-QAM scheme according to the kind of the transmitted signal and/or the channel state. Thereafter, the modulated complex symbols are processed by a transform precoder 33 and are input to a resource element mapper 34. The resource element mapper 34 may map the complex symbols to time-frequency resource elements. The processed signal may be transmitted to the BS via an SC-FDMA signal generator 35 and an antenna.

Figure 4:
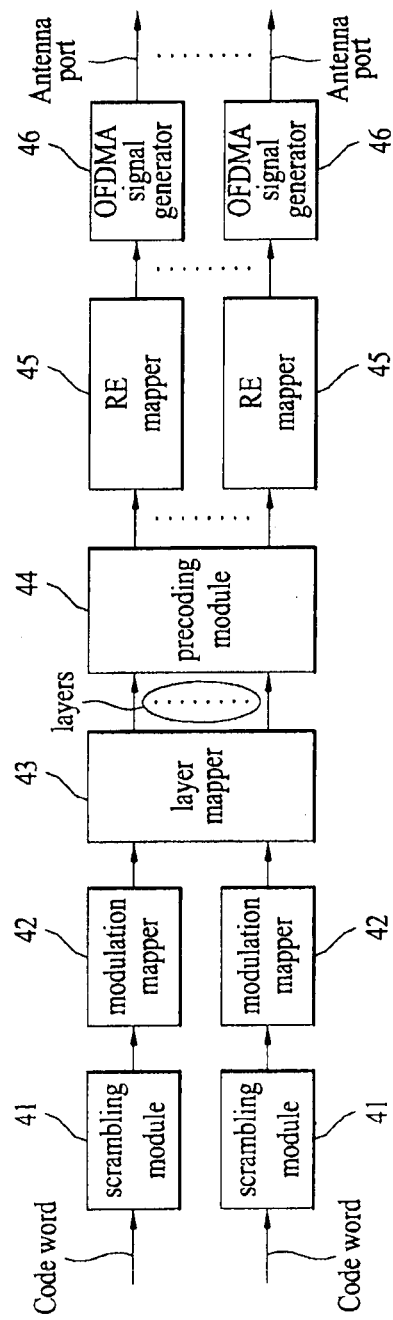
FIG. 4 is a diagram explaining a signal processing procedure of transmitting a downlink (DL) signal at a BS.

FIG. 4 is a diagram explaining a signal processing procedure of transmitting a downlink (DL) signal at a BS.

In a 3GPP LTE system, the BS may transmit one or more codewords (CWs) in the downlink. Accordingly, one or more codewords may be processed to configure complex symbols by scrambling modules 41 and modulation mappers 42, similar to the UL transmission of FIG. 3. Thereafter, the complex symbols are mapped to a plurality of layers by a layer mapper 43, and each layer may be multiplied by a precoding matrix by a precoding module 44 and may be allocated to each transmission antenna. The processed signals which will respectively be transmitted via antennas may be mapped to time-frequency resource elements by resource element mappers 45, and may respectively be transmitted via OFDM signal generators 46 and antennas.

Since an OFDMA scheme uses multiple subcarriers, a Peak-to-Average Ratio (PAPR) is relatively large due to overlapping of subcarriers. Accordingly, as described above with reference to FIGS. 3 and 4, in order to solve the problem that the PAPR is large in a UE in which power efficiency is important, an OFDMA scheme is used to transmit a downlink signal, while an single carrier-frequency division multiple access (SC-FDMA) scheme is used to transmit an uplink signal in the 3GPP system (e.g., the LTE system).

Figure 5:
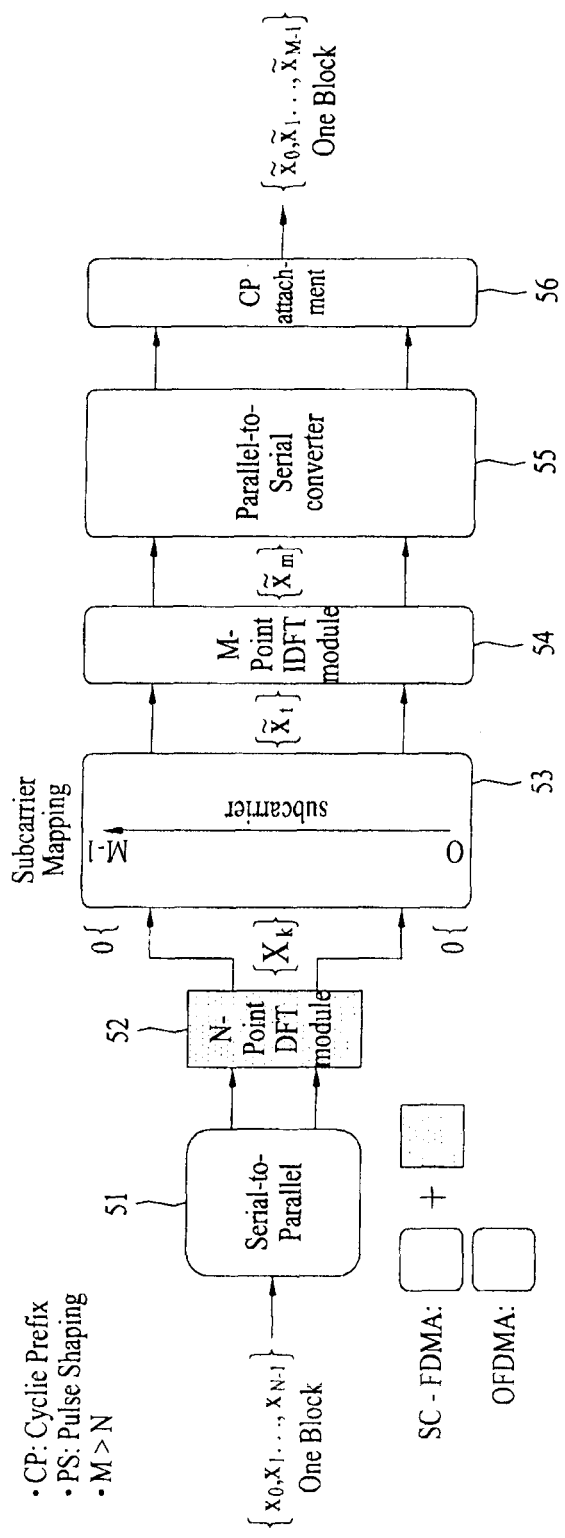
FIG. 5 is a diagram explaining an SC-FDMA scheme and an OFDMA scheme.

FIG. 5 is a diagram explaining an SC-FDMA scheme and an OFDMA scheme.

Referring to FIG. 5, a UE for transmitting a UL signal and a BS for transmitting a DL signal are identical in that a serial-to-parallel converter 51, a subcarrier mapper 53, an M-point Inverse Discrete Fourier Transform (IDFT) module 54, a parallel-to-serial converter 55 and a Cyclic Prefix (CP) adding module 56 are included.

The UE for transmitting a signal using an SC-FDMA scheme further includes an N-point DFT module 52. N data symbols formed by the serial-to-parallel converter 51 is input to the N-point DFT module 52. At this time, the N data symbol components are distributed in an entire allocated band. Subsequently, if it is assumed that a band corresponding to N subcarriers is allocated to the UE, an output signal of the N-point DFT module 52 is mapped to an allocated location of the entire uplink system band (the input of the M-point DFT module 52). That is, the N-point DFT module 52 partially offsets an IDFT process influence of the M-point IDFT module 54 such that the transmitted signal has a single carrier property.

FIG. 6 is a diagram explaining a signal mapping scheme in a frequency domain satisfying a single carrier property in the frequency domain.

FIG. 6(a) shows a localized mapping scheme and FIG. 6(b) shows a distributed mapping scheme. In the 3GPP LTE system, the localized mapping scheme is defined.

In a clustered SC-FDMA scheme which is a modified form of the SC-FDMA scheme, DFT process output samples are divided into sub-groups in a subcarrier mapping process and are non-contiguously mapped to the subcarrier domain on a sub-group by sub-group basis. In some cases, a filtering process and a cyclic extension process may be included. At this time, the sub-group is referred to as a cluster and cyclic extension indicates that a guard interval longer than maximum delay spread of a channel is inserted between contiguous symbols in order to prevent inter-symbol interference (ISI) while each symbol of a subcarrier is transmitted via a multipath channel.

Figure 7:
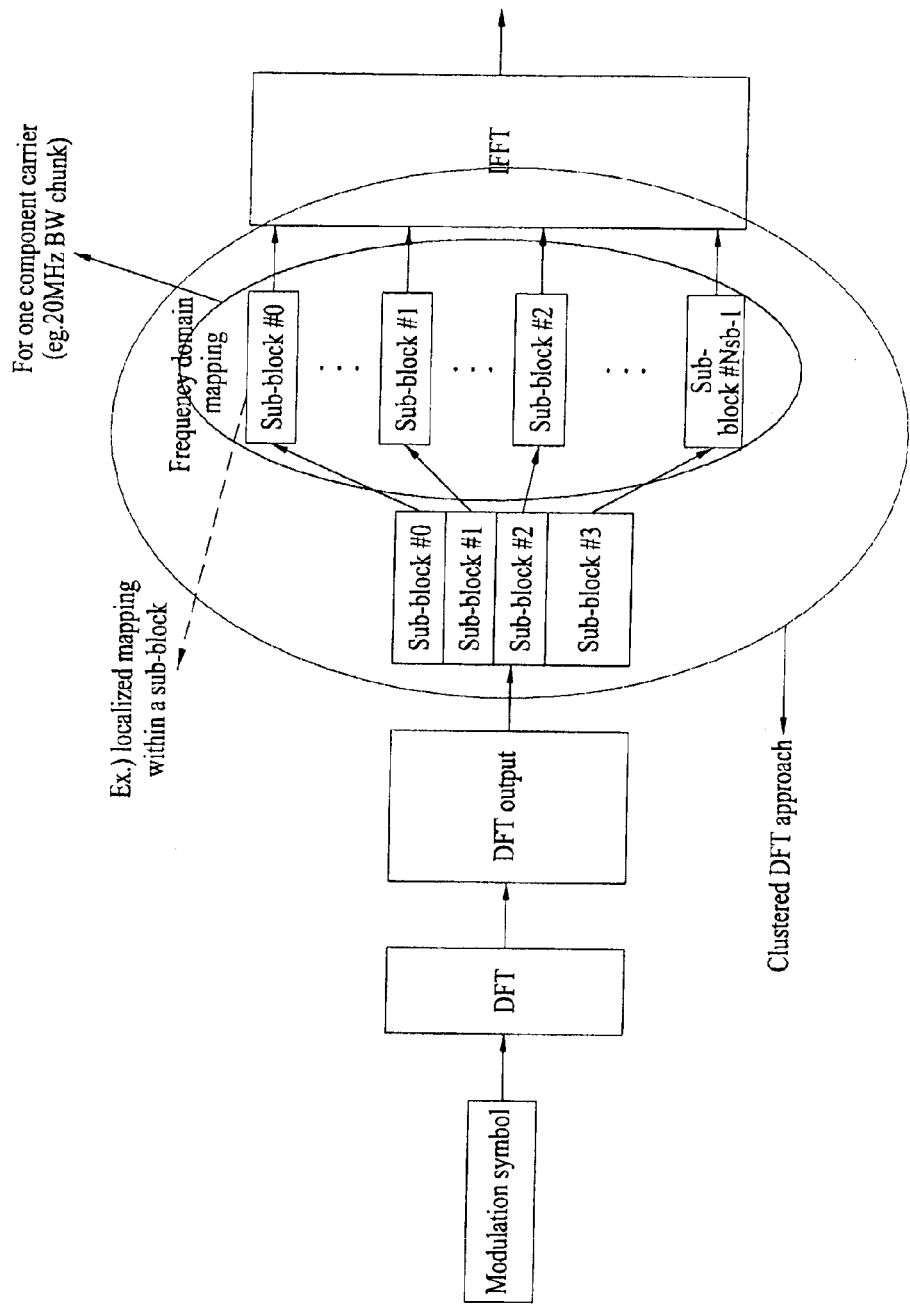
FIG. 7 is a diagram showing a signal processing procedure in which DFT process output samples are mapped to a single carrier in a clustered SC-FDMA scheme.
Figure 8:
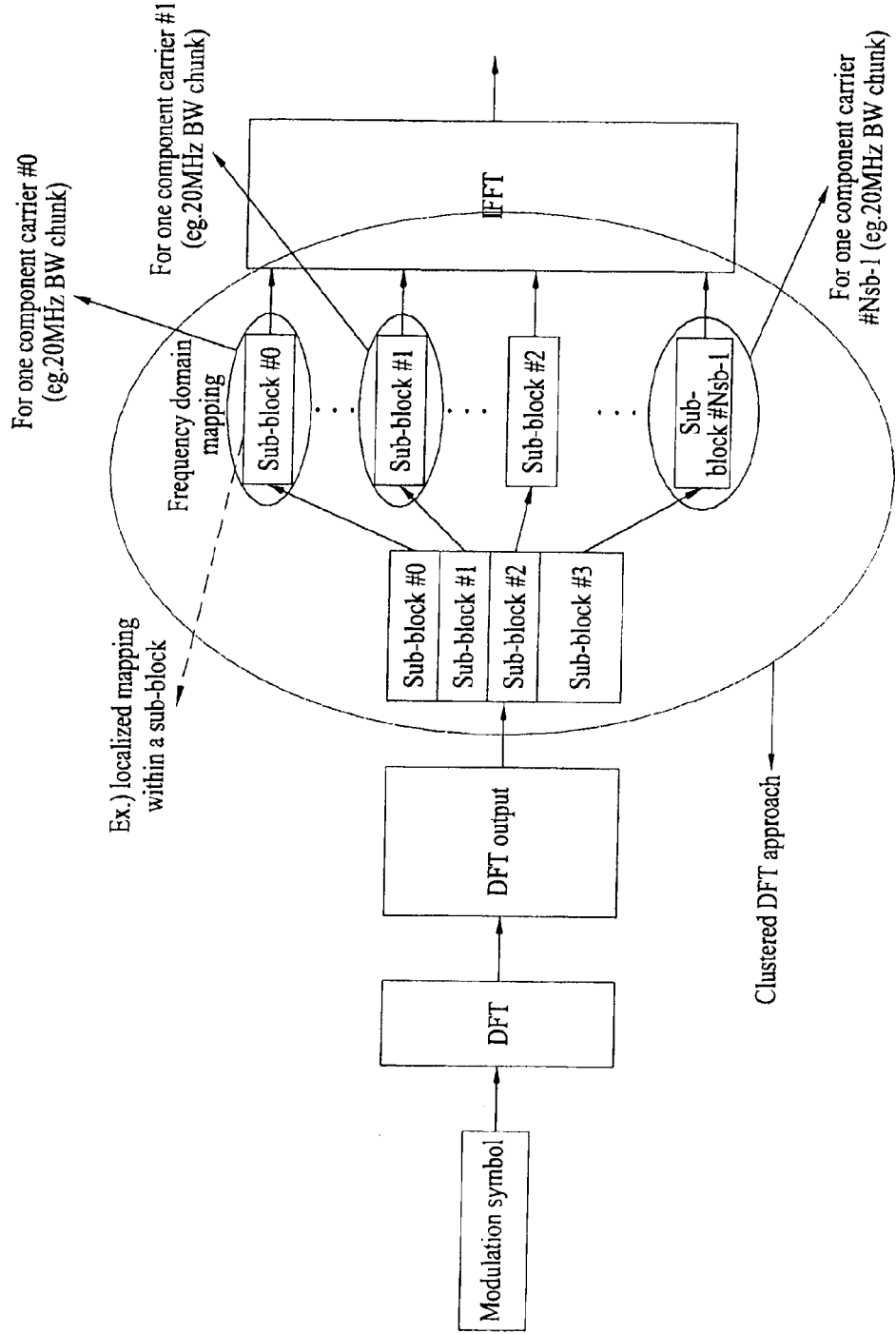
FIGS. 8 and 9 are diagrams showing a signal processing procedure in which DFT process output samples are mapped to multiple carriers in a clustered SC-FDMA scheme.
Figure 9:
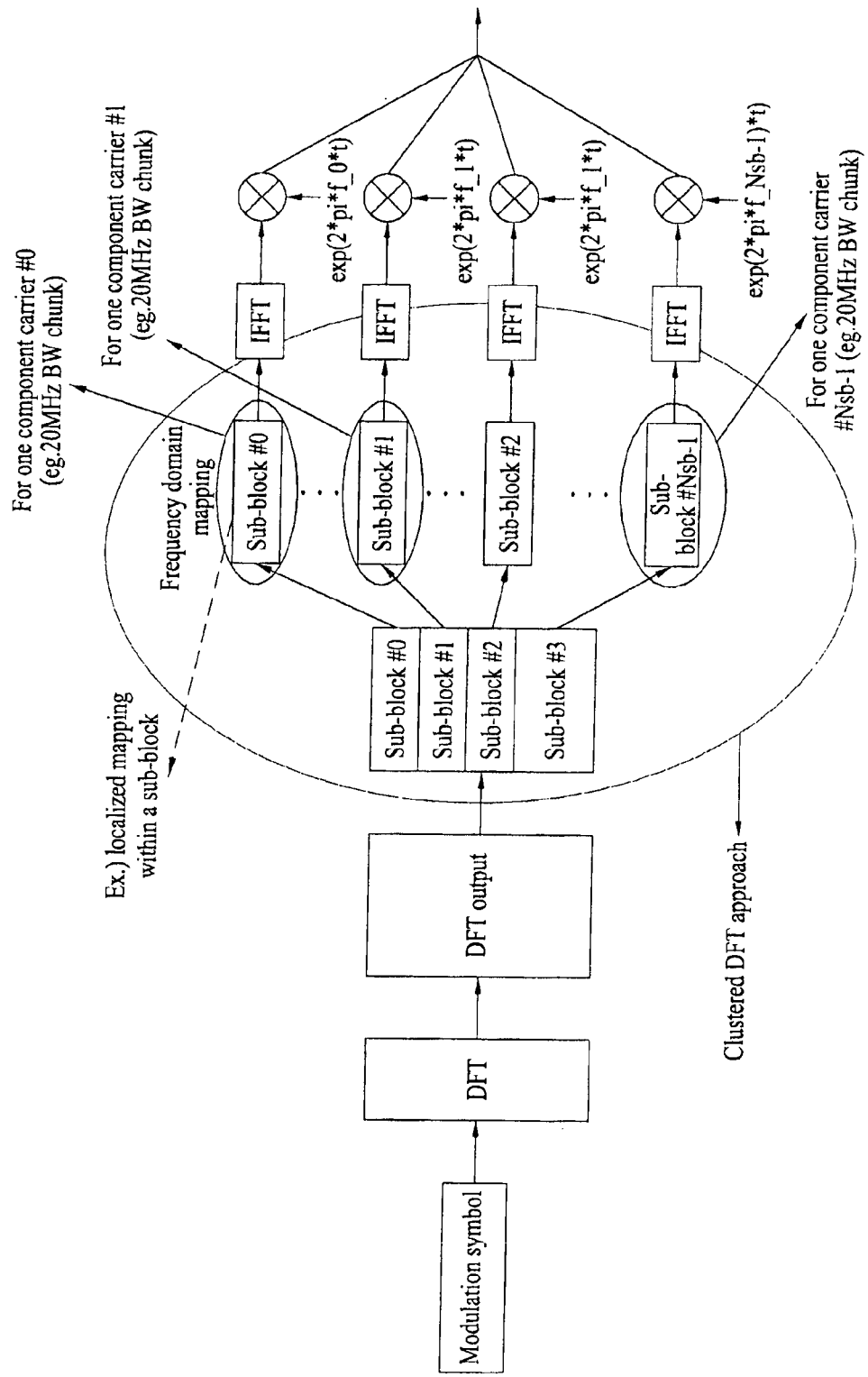

FIG. 7 is a diagram showing a signal processing procedure in which DFT process output samples are mapped to a single carrier in a clustered SC-FDMA scheme. FIGS. 8 and 9 are diagrams showing a signal processing procedure in which DFT process output samples are mapped to multiple carriers in a clustered SC-FDMA scheme.

FIG. 7 shows an example of applying an intra-carrier clustered SC-FDMA scheme and FIGS. 8 and 9 show examples of applying an inter-carrier clustered SC-FDMA scheme. FIG. 8 shows the case where a subcarrier spacing between contiguous component carriers is set and a signal is generated by a single IFFT block in a state in which component carriers are contiguously allocated in a frequency domain and FIG. 9 shows the case where a signal is generated by a plurality of IFFT blocks in a state in which component carriers are non-contiguously allocated in a frequency domain because the component carriers are not contiguous.

In the segmented SC-FDMA scheme, IFFTs corresponding in number to a certain number of DFTs are applied such that the DFTs and the IFFTs are in one-to-one correspondence and DFT spreading of the conventional SC-FDMA scheme and the frequency subcarrier mapping configuration of the IFFTs are extended. Therefore, the segmented SC-FDMA scheme is also referred to as an NxSC-FDMA or NxDFT-s-OFDMA scheme. In the present specification, the generic term "segmented SC-FDMA" is used.

Figure 10:
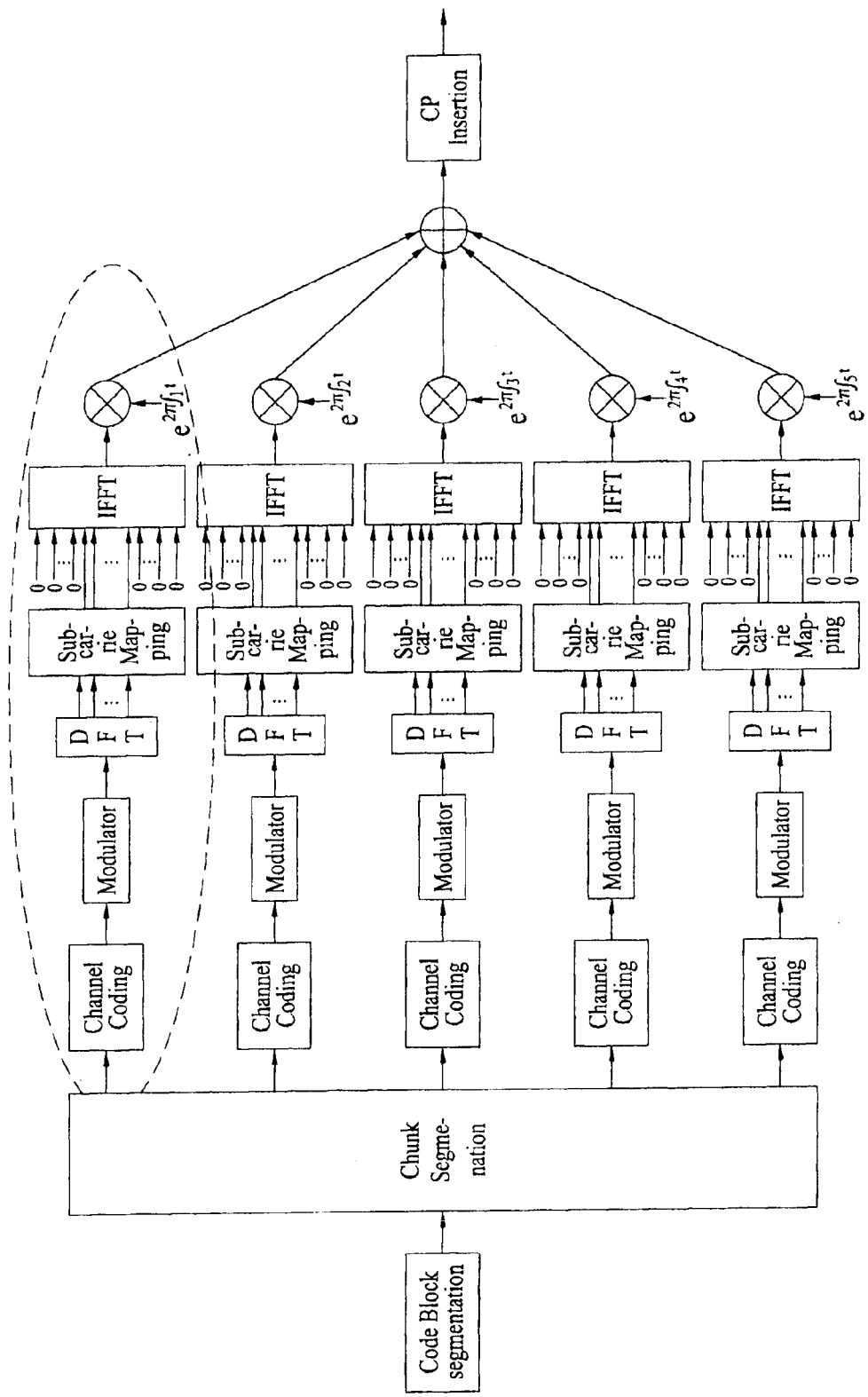
FIG. 10 is a diagram showing a signal processing procedure in a segmented SC-FDMA scheme.

FIG. 10 is a diagram showing a signal processing procedure in a segmented SC-FDMA scheme.

Referring to FIG. 10, the segmented SC-FDMA scheme is characterized in that modulation symbols of an entire time domain are grouped into N (N being an integer greater than 1) groups and a DFT process is performed on a group unit basis, in order to relax a single carrier property.

Figure 11:
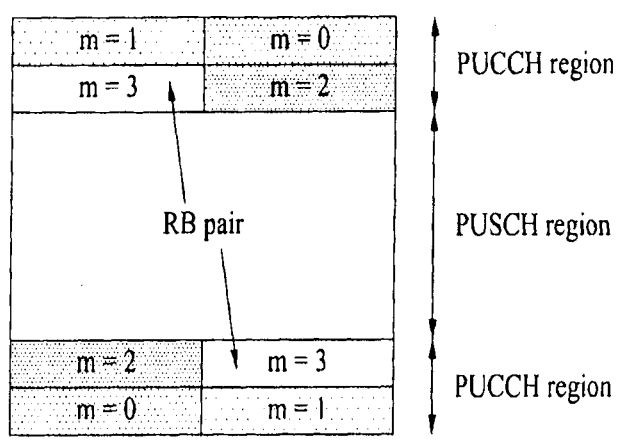
FIG. 11 is a diagram showing the structure of a UL subframe.

FIG. 11 is a diagram showing the structure of a UL subframe.

Referring to FIG. 11, the UL subframe includes a plurality of slots (e.g., two). Each slot may include SC-FDMA symbols, the number of which varies according to the length of a CP. For example, in the case of a normal CP, a slot may include seven SC-FDMA symbols. A UL subframe is divided into a data region and a control region in a frequency domain. A PUCCH carrying uplink control information is allocated to the control region. A PUSCH carrying user data is allocated to the data region. One UE does not simultaneously transmit a PUCCH and a PUSCH in order to maintain a single carrier property. An RB pair (e.g., m=0, 1, 2, 3) (e.g., an RB pair of frequency-mirrored locations) located at both ends of the data region in a subframe on the frequency axis is allocated to the PUCCH of one UE. RBs belonging to the RB pair occupy different subcarriers in two slots. The RB pair allocated to the PUCCH is frequency-hopped in a slot boundary.

Figure 12:
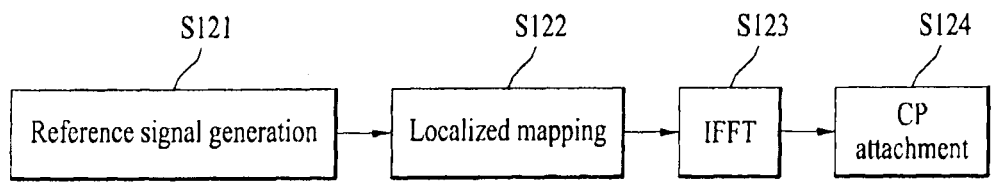
FIG. 12 is a diagram illustrating a signal processing procedure for transmitting a Reference Signal (RS) in uplink.

FIG. 12 is a diagram illustrating a signal processing procedure for transmitting a Reference Signal (RS) in uplink. Data is transformed into a frequency domain signal by a DFT precoder, is subjected to frequency mapping and IFFT, and is transmitted. In contrast, an RS bypasses a DFT precoder. More specifically, an RS sequence is directly generated in a frequency domain (step 121), is subjected to a localized-mapping process (step 122), is subjected to IFFT (step 123), is subjected to a CP attachment process (step 124), and is transmitted.

FIG. 13 is a diagram showing the structure of a subframe for transmitting a demodulation reference signal (DMRS).

FIG. 13(a) is a diagram showing the structure of a subframe for transmitting a DMRS in the case of normal CP and FIG. 13(b) is a diagram showing the structure of a subframe for transmitting a DMRS in the case of extended CP. Referring to FIG. 13(a), a DMRS is transmitted via fourth and eleventh SC-FDMA symbols and, in FIG. 13(b), a DMRS is transmitted via third and ninth SC-FDMA symbols.

1.2. PUCCH (Physical Uplink Control Channel)

A PUCCH includes the following format in order to transmit control information.

(1) Format 1: This is used for on-off keying (OOK) modulation and scheduling request (SR)

(2) Format 1a and Format 1b: They are used for ACK/NACK transmission

1) Format 1a: BPSK ACK/NACK for one codeword
  2) Format 1b: QPSK ACK/NACK for two codewords (3) Format 2: This is used for QPSK modulation and CQI transmission (4) Format 2a and Format 2b: They are used for CQI and ACK/NACK simultaneous transmission.

Table 1 shows a modulation scheme and the number of bits per subframe according to a PUCCH format. Table 2 shows the number of RSs per slot according to a PUCCH format. Table 3 shows SC-FDMA symbol locations of an RS according to a PUCCH format. In Table 1, the PUCCH formats 2a and 2b correspond to the normal CP case.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

TABLE 2

| PUCCH format | Normal cyclic prefix | Extended cyclic prefix |
|---|---|---|
| 1, 1a, 1b | 3 | 2 |
| 2 | 2 | 1 |
| 2a, 2b | 2 | N/A |

TABLE 3

| | Set of values for l | |
|---|---|---|
| PUCCH format | Normal cyclic prefix | Extended cyclic prefix |
| 1, 1a, 1b | 2, 3, 4 | 2, 3 |
| 2, 2a, 2b | 1, 5 | 3 |

Figure 14:
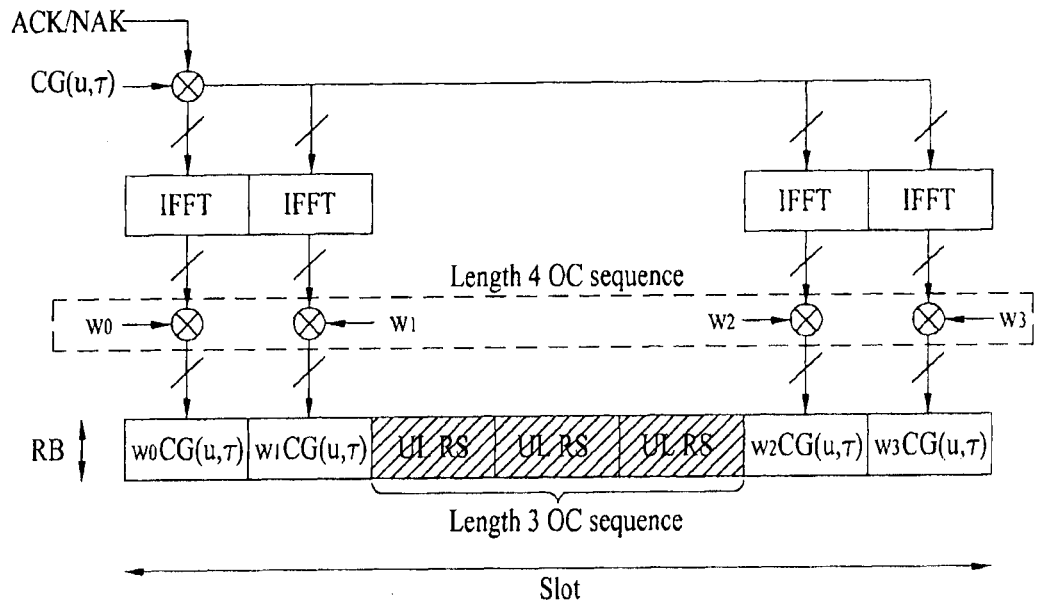
FIG. 14 is a diagram showing PUCCH formats 1a and 1b in the normal CP case.
Figure 15:
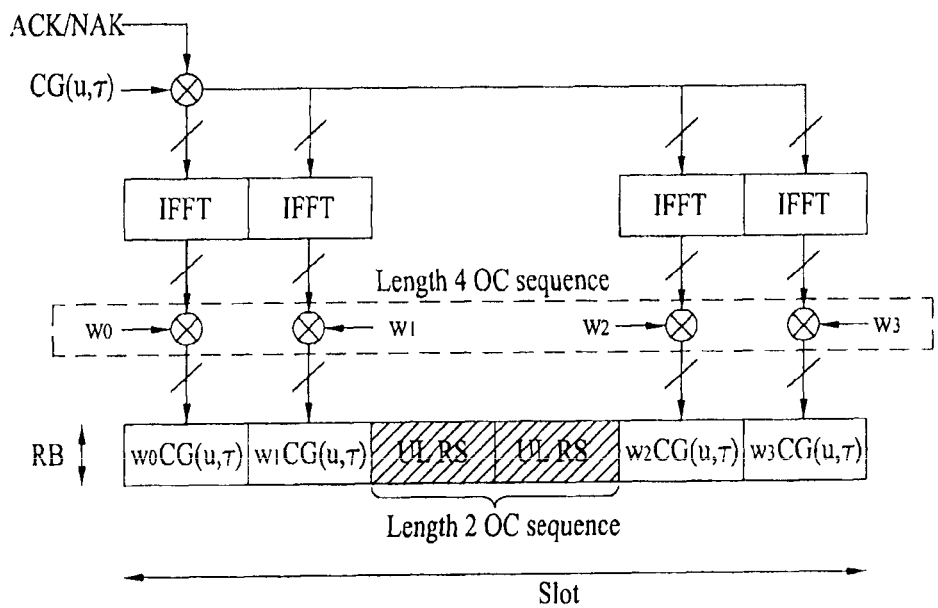
FIG. 15 is a diagram showing PUCCH formats 1a and 1b in the extended CP case.

FIG. 14 shows PUCCH formats 1a and 1b in the normal CP case. FIG. 15 shows PUCCH formats 1a and 1b in the extended CP case.

In the PUCCH formats 1a and 1b, the same control information is repeated within a subframe in slot units. Each UE transmits an ACK/NACK signal through different resources including different cyclic shifts (CSs) (frequency domain codes) of a computer-generated constant amplitude zero auto correlation (CG-CAZAC) sequence and orthogonal covers (OCs) or orthogonal cover codes (OCCs) (time domain codes). The OC includes, for example, a Walsh/DFT orthogonal code. If the number of CSs is 6 and the number of OCs is 3, a total of 18 UEs may be multiplexed in the same physical resource block (PRB) in the case of using a single antenna. Orthogonal sequences w0, w1, w2 and w3 may be applied in a certain time domain (after FFT modulation) or a certain frequency domain (before FFT modulation).

For SR and persistent scheduling, ACK/NACK resources including CSs, OCs and PRBs may be provided to a UE through radio resource control (RRC). For dynamic ACK/NACK and non-persistent scheduling, ACK/NACK resources may be implicitly provided to the UE by a lowest CCE index of a PDCCH corresponding to a PDSCH.

Table 4 shows length-4 OCs for PUCCH format 1/1a/1b and Table 5 shows length-3 OCs for PUCCH format 1/1a/1b.

TABLE 4

| Sequence index $n_{oc}$ ($n_s$) | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 5

| Sequence index $n_{oc}$ ($n_s$) | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 6 shows OCs $[\overline{w}(0) \ldots \overline{w}(N_{RS}^{PUCCH}-1)]$ for RS in PUCCH format 1a/1b.

| Sequence index $\overline{n}_{oc}$ ($n_s$) | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 16:
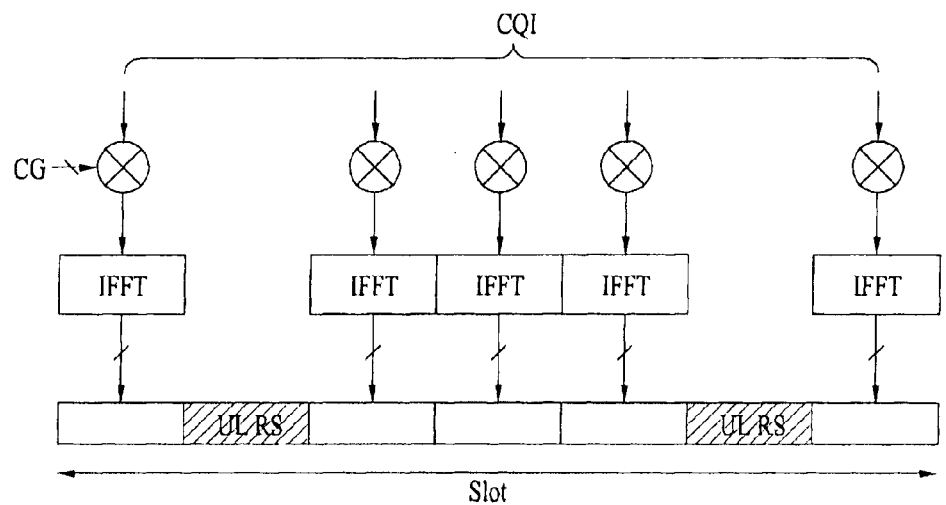
FIG. 16 is a diagram showing PUCCH format 2/2a/2b in the normal CP case.
Figure 17:
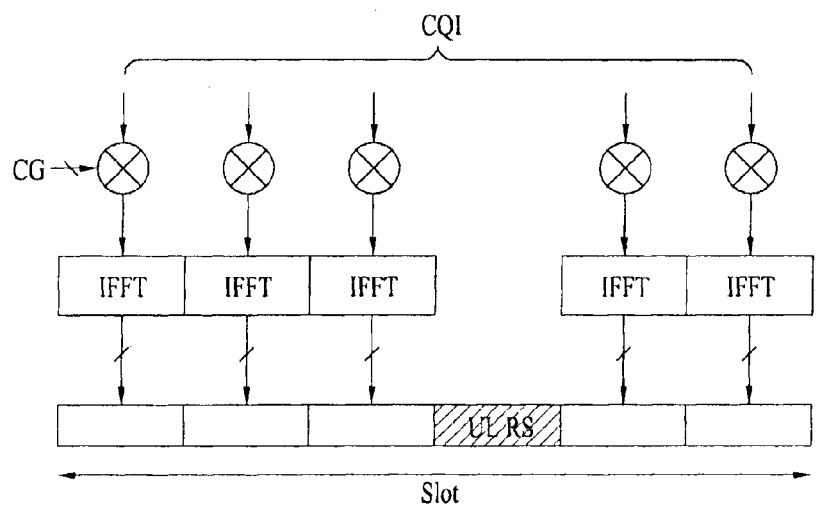
FIG. 17 is a diagram showing PUCCH format 2/2a/2b in the extended CP case.

FIG. 16 shows PUCCH format 2/2a/2b in the normal CP case. FIG. 17 shows PUCCH format 2/2a/2b in the extended CP case.

Referring to FIGS. 16 and 17, one subframe includes 10 QPSK data symbols in addition to an RS symbol in the normal CP case. Each QPSK symbol is spread in a frequency domain by a CS and is then mapped to a corresponding SC-FDMA symbol. SC-FDMA symbol level CS hopping may be applied in order to randomize inter-cell interference. RSs may be multiplexed by CDM using CS. For example, if it is assumed that the number of available CSs is 12 or 6, 12 or 6 UEs may be multiplexed in the same PRB. For example, in PUCCH format 1/1a/1b and 2/2a/2b, a plurality of UEs may be multiplexed by CS+OC+PRB and CS+PRB.

FIG. 18 is a diagram explaining ACK/NACK channelization for PUCCH formats 1a and 1b. FIG. 18 shows the case of $\Delta_{shift}^{PUCCH}=2$.

Figure 19:
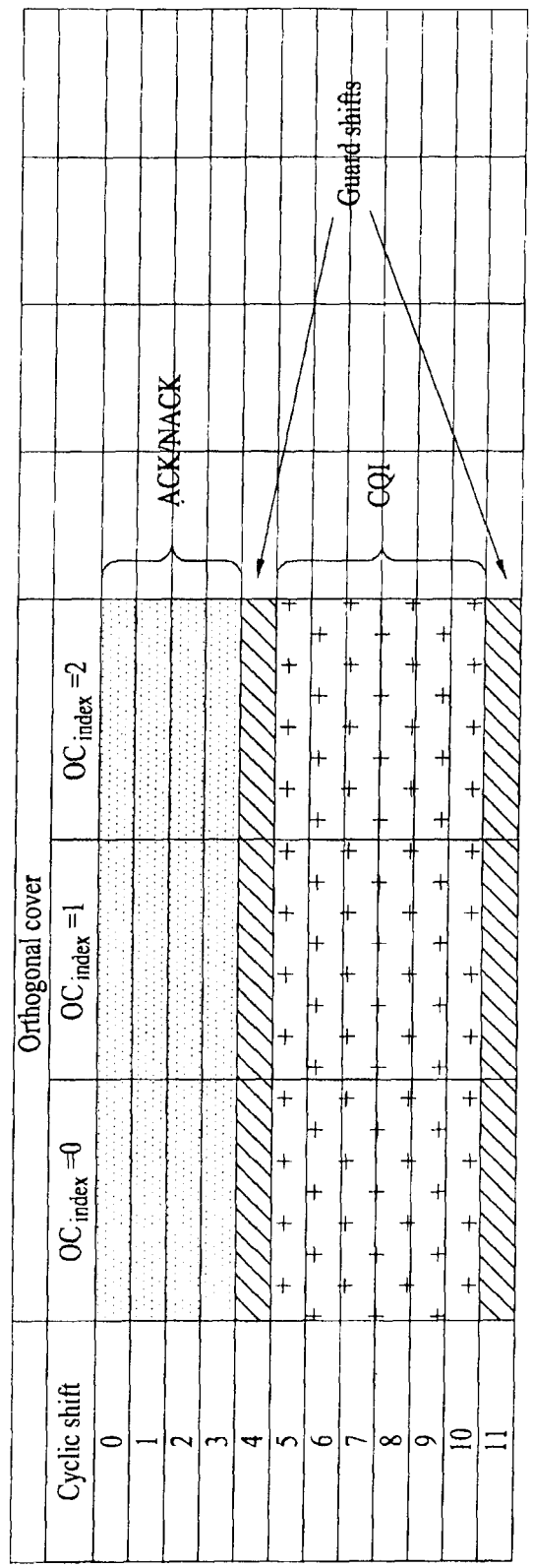
FIG. 19 is a diagram showing channelization of a structure in which PUCCH format 1a/1b and format 2/2a/2b are mixed within the same PRB.

FIG. 19 is a diagram showing channelization of a structure in which PUCCH format 1a/1b and format 2/2a/2b are mixed within the same PRB.

CS hopping and OC remapping may be applied as follows.

(1) Symbol-based cell-specific CS hopping for inter-cell interference randomization (2) Slot level CS/OC remapping
  1) for inter-cell interference randomization
  2) slot-based access for mapping between ACK/NACK channels and resources k Resource $n_r$ for the PUCCH format 1a/1b includes the following combination.

(1) CS (=DFT OC in a symbol level) ($n_{cs}$)
(2) OC (OC in a slot level) ($n_{oc}$)
(3) frequency RB ($n_{rb}$)

When indexes representing the CS, the OC and the RB are respectively $n_{cs}$, $n_{oc}$ and $n_{rb}$, a representative index $n_r$ includes $n_{cs}$, $n_{oc}$ and $n_{rb}$. $n_r$ satisfies $n_r=(n_{cs}, n_{oc}, n_{rb})$.

A CQI, a PMI, a RI, and a combination of a CQI and ACK/NACK may be transmitted through PUCCH format 2/2a/2b. Reed Muller (RM) channel coding may be applied.

For example, in an LTE system, channel coding for a UL CQI is described as follows. A bit stream $a_0$, $a_1$, $a_2$, $a_3, \ldots, a_{A-1}$ is channel-coded using a (20, A) RM code. $a_0$ and $a_{A-1}$ represent a Most Significant Bit (MSB) and a Least Significant Bit (LSB), respectively. In the extended CP case, a maximum information bit number is 11 except for the case where the CQI and the ACK/NACK are simultaneously transmitted. After the bit stream is coded to 20 bits using the RM code, QPSK modulation may be applied. Before QPSK modulation, coded bits may be scrambled.

Table 7 shows a base sequence for the (20, A) code.

TABLE 7

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 1 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 1 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Equation 1.

$$b_i = \sum_{n=0}^{A-1} (a_n \cdot M_{i,n}) \mod 2 \qquad \text{Equation 1}$$

where, $i=0, 1, 2, \ldots, B-1$ is satisfied.

In case of wideband reports, a bandwidth of a uplink control information (UCI) field for CQI/PMI is shown in Tables 8 to 10.

Table 8 shows an uplink control information (UCI) field for CQI feedback in case of wideband reports (single antenna port, transmit diversity or open loop spatial multiplexing PDSCH transmission).

TABLE 8

| Field | Bitwidth |
| --- | --- |
| Wide-band CQI | 4 |

Table 9 shows a UCI field for wideband CQI and PMI feedback in case of wideband reports (closed loop spatial multiplexing PDSCH transmission).

TABLE 9

| | Bitwidths | | | |
| --- | --- | --- | --- | --- |
| | 2 antenna ports | | 4 antenna ports | |
| Field | Rank = 1 | Rank = 2 | Rank = 1 | Rank > 1 |
| Wide-band CQI | 4 | 4 | 4 | 4 |
| Spatial differential CQI | 0 | 3 | 0 | 3 |
| Precoding matrix indication | 2 | 1 | 4 | 4 |

Table 10 shows a UCI field for RI feedback for wideband reports.

TABLE 10

| | Bitwidths | | |
| --- | --- | --- | --- |
| | | 4 antenna ports | |
| Field | 2 antenna ports | Max 2 layers | Max 4 layers |
| Rank indication | 1 | 1 | 2 |

Figure 20:
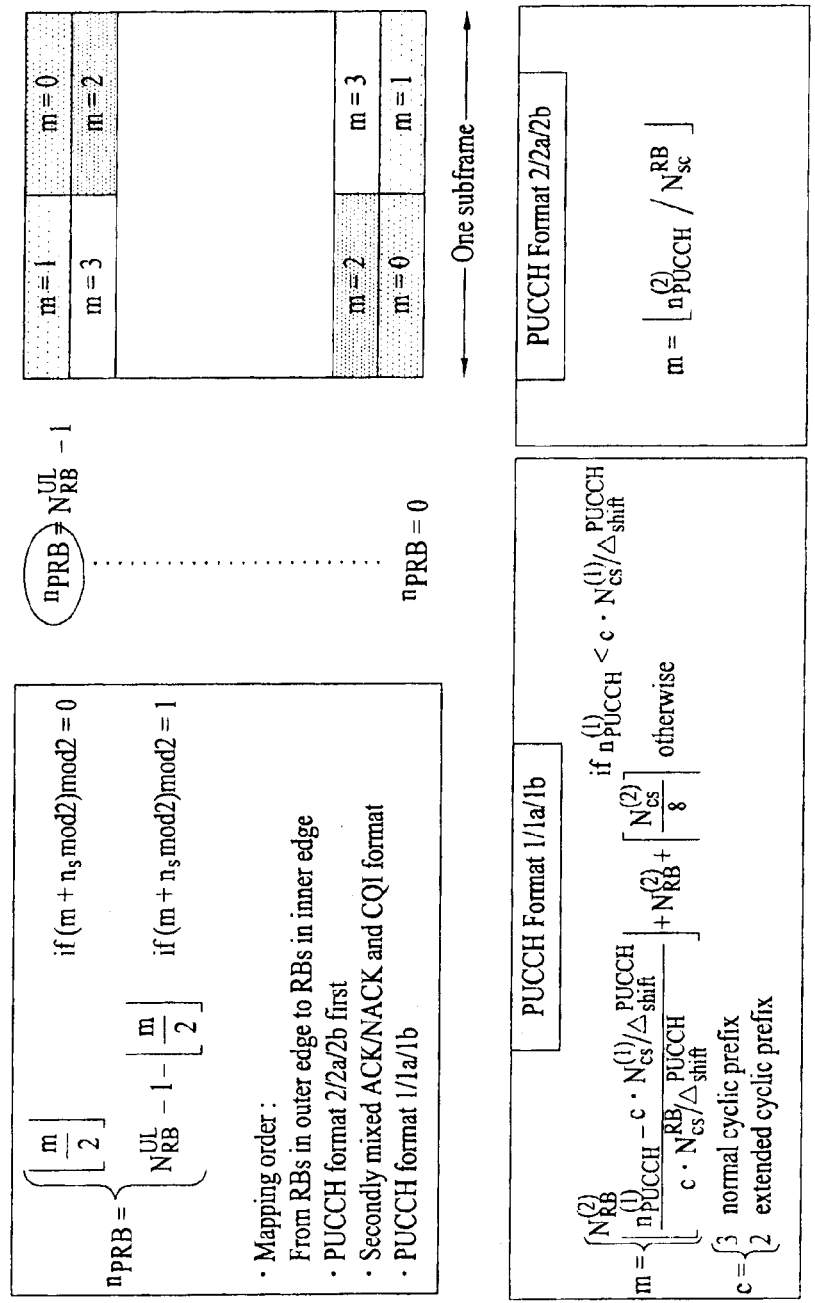
FIG. 20 shows PRB allocation.

FIG. 20 shows PRB allocation. As shown in FIG. 20, the PRB may be used for PUCCH transmission in a slot $n_s$.

2. General Carrier Aggregation

A communication environment considered in the embodiments of the present invention includes all multi-carrier environments. That is, a multi-carrier system or a carrier aggregation (CA) system used in the present invention refers to a system for aggregating and utilizing one or more carriers having a bandwidth smaller than a target bandwidth, for wideband support.

In the present invention, multi-carrier refers to carrier aggregation. Carrier aggregation includes aggregation of contiguous carriers and aggregation of non-contiguous carriers. In addition, the number of component carriers aggregated in downlink and uplink may be differently set. The case where the number and/or bandwidth of downlink component carriers (DL CCs) and the number and bandwidth of uplink component carriers (UL CCs) are the same is referred to as symmetric aggregation and the case where the number and/or bandwidth of downlink component carriers (DL CCs) and the number and bandwidth of uplink component carriers (UL CCs) are different is asymmetric aggregation. Such carrier aggregation is used interchangeable with the terms "carrier aggregation", "bandwidth aggregation" or "spectrum aggregation".

Carrier aggregation configured by aggregating two or more CCs aims at support a bandwidth of up to 100 MHz in an LTE-A system. When one or more carriers having a bandwidth smaller than a target bandwidth are aggregated, the bandwidth of the aggregated carriers may be restricted to a bandwidth used in the existing system, for backward compatibility with the existing IMT system. For example, the existing 3GPP LTE system may support bandwidths of 1.4, 3, 5, 10, 15 and 20 MHz and an LTE_Advanced (LTE_A) system evolved from the LTE system may support a bandwidth greater than 20 MHz using only the bandwidths supported by the LTE system. Alternatively, the carrier aggregation system used in the present invention may define a new bandwidth so as to support CA, regardless of the bandwidths used in the existing system.

The LTE-A system uses the concept of a cell in order to manage radio resources. The above-described carrier aggregation environment may be called a multiple-cell environment. The cell is defined as a combination of downlink resources (DL CCs) and uplink resources (UL CCs), and the uplink resources are not mandatory. Accordingly, the cell may be composed of downlink resources alone or both downlink resources and uplink resources. If a specific UE has one configured serving cell, the UE may have one DL CC and one UL CC. If a specific UE has two or more configured serving cells, the UE may have DL CCs corresponding in number to the number of cells and the number of UL CCs may be equal to or less than the number of DL CCs, and vice versa. If a specific UE has a plurality of configured service cells, a carrier aggregation environment in which the number of DL CCs is greater than the number of UL CCs may also be supported. That is, carrier aggregation may be regarded as aggregation of two or more cells having different carrier frequencies (center frequencies of a cell). If carrier aggregation is supported, linkage between a carrier frequency (or a DL CC) of downlink resources and a carrier frequency (or a UL CC) of uplink resources may be indicated by system information. The DL CC and the UL CC may be referred to as DL cell and UL cell, respectively. The cell described herein should be distinguished from a "cell" as a general region covered by a BS.

A cell used in the LTE-A system includes a primary cell (PCell) and a secondary cell (SCell). The PCell and the SCell may be used as service cells. In case of a UE which is in an RRC_connected state but does not set carrier aggregation or supports carrier aggregation, only one serving cell composed of a PCell exists. In contrast, in case of a UE which is in an RRC_CONNECTED state and sets carrier aggregation, one or more serving cells exist. The serving cell includes a PCell and one or more SCell.

A serving cell (PCell and SCell) may be set through an RRC parameter. PhyCellId is a physical layer identifier of a cell and has an integer value from 0 to 503. SCellIndex is a short identifier used to identify an SCell and has an integer value from 1 to 7. A value of 0 is applied to the PCell and SCellIndex is previously given to be applied to the Scell. That is, a cell having a smallest cell ID (or a cell index) in ServCellIndex becomes the PCell.

The PCell refers to a cell operating on a primary frequency (e.g., a primary CC (PCC)). The PCell is used to perform an initial connection establishment process or a connection re-establishment process at a UE. The PCell may indicate a cell indicated in a handover process. The PCell refers to a cell for performing control-associated communication among serving cells set in a carrier aggregation environment. That is, a UE may receive a PUCCH allocated by a PCell to which the UE belongs and perform transmission and use only the PCell to acquire system information and change a monitoring procedure. In evolved universal terrestrial radio access (E-UTRAN), a UE supporting a carrier aggregation environment may change only the PCell for a handover procedure using an RRCConnectionReconfiguration message of a higher layer including mobilityControlInfo.

The SCell refers to a cell operating on a secondary frequency (e.g., a secondary CC (SCC)). Only one PCell may be allocated to a specific UE and one or more SCells may be allocated to the specific UE. The SCell may be configured after radio resource control (RRC) connection establishment and may be used to provide additional radio resources. A PUCCH is not present in cells except for the PCell among serving cells set in a carrier aggregation environment, that is, the SCells. E-UTRAN may provide all system information associated with the operation of an associated cell in an RRC_CONNECTED state via a dedicated signal when SCells are added to a UE supporting a carrier aggregation environment. Change of system information may be controlled by release and addition of the SCell. At this time, an RRCConnectionReconfiguration message of a higher layer may be used. The E-UTRAN may transmit a dedicated signal having a different parameter to each UE, rather than broadcasting a signal in the associated SCell.

After an initial security activation process begins, an E-UTRAN may configure a network by adding one or more SCells to a PCell initially configured in a connection establishment process. In a carrier aggregation environment, the PCell and the SCell may operate as respective CCs. In the following embodiments, a primary CC (PCC) may be used as the same meaning as the PCell and a secondary CC (SCC) may be used as the meaning as the SCell.

A DL control information signaling method and an uplink control information signaling method of a first layer (physical layer) supporting wideband will now be described.

A method of transmitting DL control information such as a control region size, UL and DL resource allocation and downlink HARQ ACK/NACK indication via a PDCCH will now be described.

In downlink, an independent control region size may be applied to each CC. At this time, the method (modulation, coding, mapping to resource elements, etc.) of the existing 3GPP LTE release-8 system for a PCFICH may be equally used for a carrier having a control region. For signaling for resource allocation for DL (PDSCH) and UL (PUSCH) transmission, a PDCCH may allocate PDSCH resources to the same CC, to which a PDCCH is allocated, and allocate PUSCH resources to a linked since UL CC. At this time, a PDCCH structure (resource mapping based on the same coding and the same CCE) of the existing 3GPP LTE release-8 system and a downlink control information (DCI) format may be equally used for each CC. In addition, a PDCCH may allocate a PDSCH or a PUSCH to one of multiple CCs using a carrier indicator field (CIF). At this time, the DCI format of the existing 3GPP LTE release-8 system may be extended to include a CIF having 1 bit to 3 bits and the PDCCH structure (resource mapping based on the same coding and the same CCE) of the existing 3GPP LTE release-8 system may be equally used. A CIF may be semi-statically set. For DL control signaling for DL HARQ ACK/NACK indication, a PHICH physical transmission method (orthogonal code configuration, modulation, scramble sequence, mapping to resource elements) in the existing 3GPP LTE release-8 system may be equally used. At this time, the PHICH is transmitted via a DL CC used for UL grant transmission. If the number of DL carriers is equal to or greater than the number of UL CCs, a CIF may not be used. At this time, the PHICH resource mapping rule of the existing 3GPP LTE release-8 system may be equally used.

A method of transmitting UL control information such as HARQ ACK/NACK, scheduling request (SR) and channel state information (CSI) via a PUCCH will now be described.

For uplink control information signaling for HARQ ACK/NACK, all HARQ ACK/NACK may be transmitted via a PUCCH when a PUSCH is not transmitted. In general, although transmission of one ACK/NACK may be supported with respect to each DL CC transport block, ACK/NACK transmission may be restricted with respect to the DL CC transport block in order to prevent power consumption. At this time, rather than optimization of resources for many UEs to which multiple DL CCs are simultaneously scheduled, ACK/NACK resources may be allocated in consideration of UE performance and power control. The SR is transmitted via a PUCCH and a specific UL CC may be semi-statically mapped to one UE. Periodic CSI reports via a PUCCH may support up to a maximum of 5 DL CCs. In CSI, a specific UL CC may be semi-statically mapped to one UE and the rule of the existing 3GPP LTE release-8 system for CQI, PMI and RI may be used in order to extend CSI payload or reduce report overhead.

Figure 21:
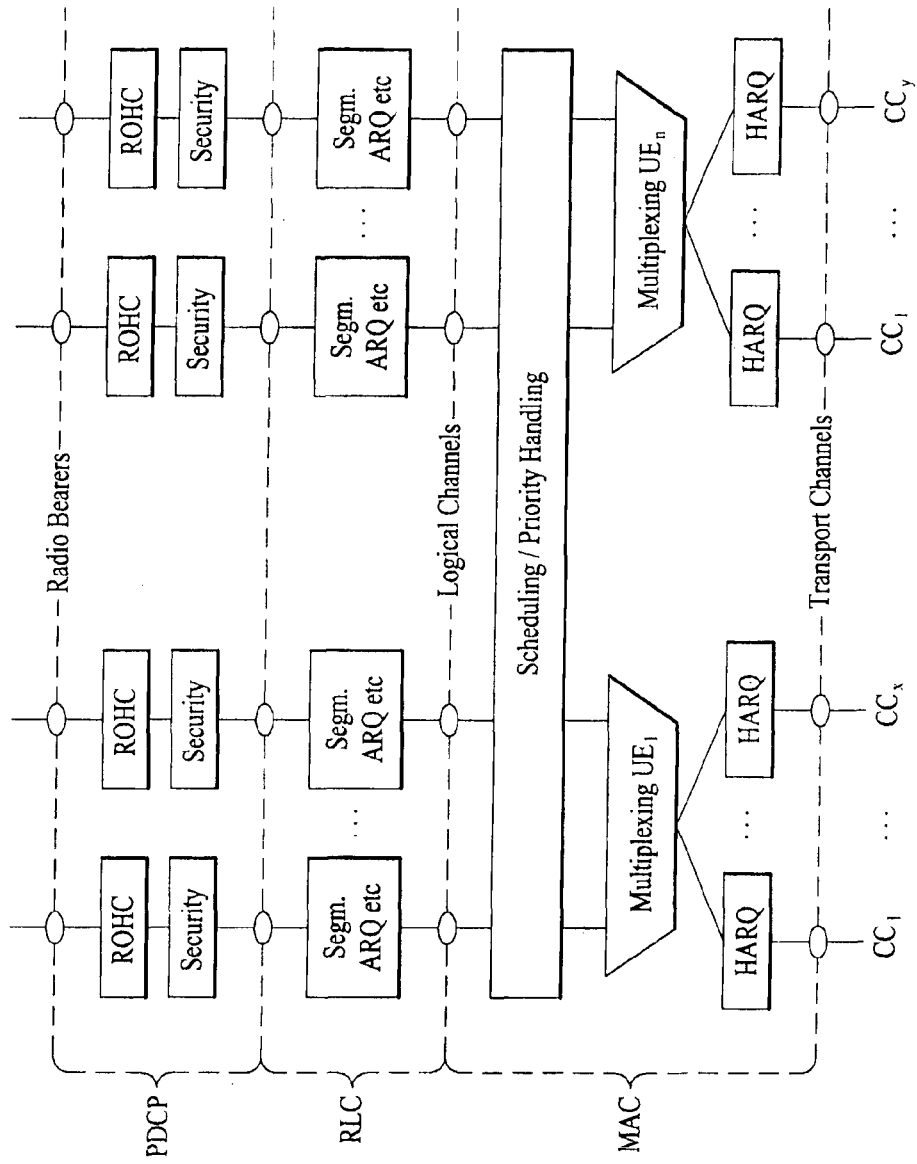
FIG. 21 is a diagram showing the structure of a second layer (layer 2) for DL in a multi-carrier system.
Figure 22:
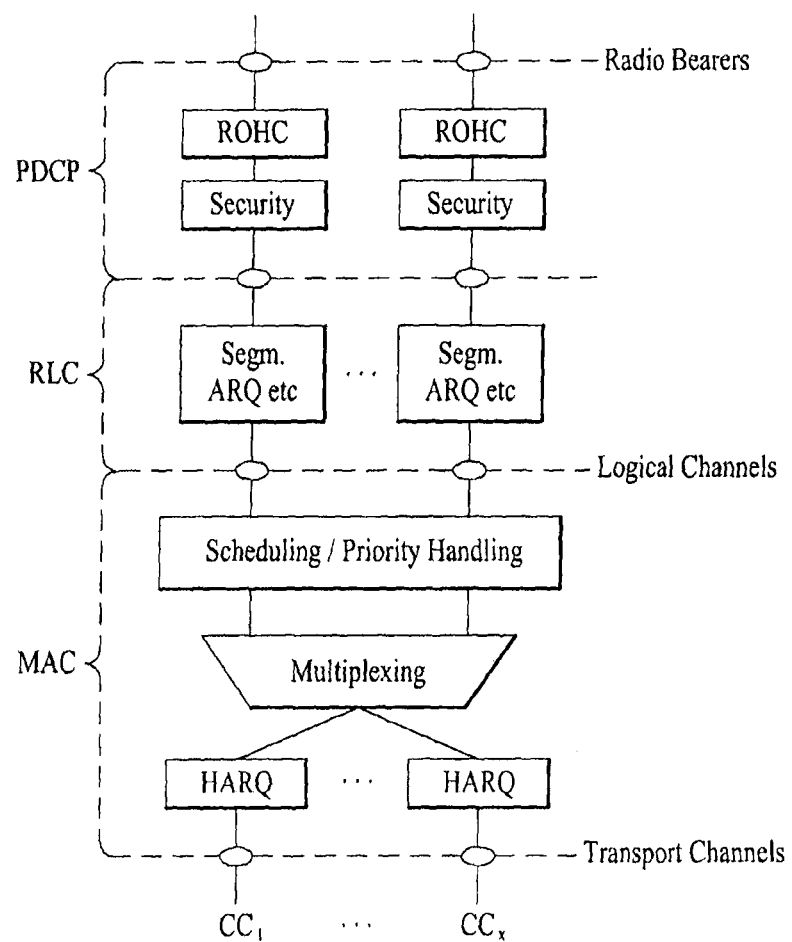
FIG. 22 is a diagram showing the structure of a second layer (layer 2) for UL in a multi-carrier system.

FIG. 21 is a diagram showing the structure of a second layer (layer 2) for DL in a multi-carrier system. FIG. 22 is a diagram showing the structure of a second layer (layer 2) for UL in a multi-carrier system.

1) User Plane

In a multi-carrier environment, one HARQ entity is required per CC, as compared to the structure of the second layer of the existing 3GPP LTE release-8 system.

In a media access control (MAC) layer, the second layer of HARQ may maintain the existing 3GPP LTE release-8 system from the viewpoint of a UE. One transport block and one independent HARQ entity are present per scheduled CC (if spatial multiplexing is not supported, a maximum of 2 transport blocks in case of spatial multiplexing). Each transport block is mapped to a single CC and all HARQ is retransmitted via a corresponding CC. Multiple CCs may be simultaneously scheduled to the UE and a maximum of one random access procedure may be performed. If one CC is set in a UE, discontinuous reception (DRX) may become a baseline. In other cases, an active time for the same DRX operation, that is, PDCCH monitoring, is applied to all configured CCs. In the active time, a PDSCH may be scheduled to another configured CC.

An RLC protocol of the existing 3GPP LTE release-8 system may be equally applied to a radio link control (RLC) layer and a packet data convergence protocol (PDCP) layer.

2) Control Plane

The structure of the control plane of the existing 3GPP LTE release-8 system may be equally applied.

A cell is identified by a unique E-UTRAN cell global identifier (ECGI) according to transmission of system information included in one CC. System information of the existing 3GPP LTE release-8 system and extension information for LTE-A may be transmitted via a CC which is backward compatible with the existing system. Each CC may provide system information via a broadcast control channel (BCCH).

As in the existing 3GPP LTE release-8 system, a UE has one RRC connection with a network. A cell (hereinafter, referred to as a special cell) in a connected mode may provide security input (a single ECGI, a single physical cell identity (PCI), a single absolute radio frequency channel number (ARFCN)) and non access stratum (NAS) mobility information (e.g., tracking area identity (TA)).

After RRC connection with the special cell is established, reconfiguration, addition and removal of a CC may be performed a radio access reconfiguration message (RRCConnectionReconfiguration) including mobilityControlInfo. That is, intra-cell handover may be performed. In addition, the radio access reconfiguration message which does not include mobility control information may be used to add a CC and to remove a CC except for a CC corresponding to the special cell.

In intra-cell handover, the radio access reconfiguration message including mobilityControlInfo may remove, reconfigure or add a CC used in a target cell. When a new CC is added, dedicated RRC signaling may be used to deliver information about a CC necessary for CC transmission/reception.

Even when a UE detects failure of one CC, triggering may not be performed for RRC connection reestablishment. If all CCs for receiving a PDCCH fails, if all UL communication is lost or if information indicating a maximum number of times of retransmission has been reached is sent from an RLC layer, a UE may reestablish RRC connection.

The UE observes a CC using a carrier frequency different from that of a measurement object in which a CC needs to be configured for measurement. Inter-frequency neighbor measurements include all frequencies of carriers which are not set as a CC.

A movement procedure of an idle mode of the existing 3GPP LTE release-8 system may be equally applied to a network in which a subset of component carriers for the idle mode is set.

Hereinafter, for convenience of description, higher layers such as a packet data convergence protocol (PDCP) layer and a radio link control (RLC) layer shown in FIGS. 21 and 22 will be briefly described as a media access control (MAC) layer.

Figure 23:
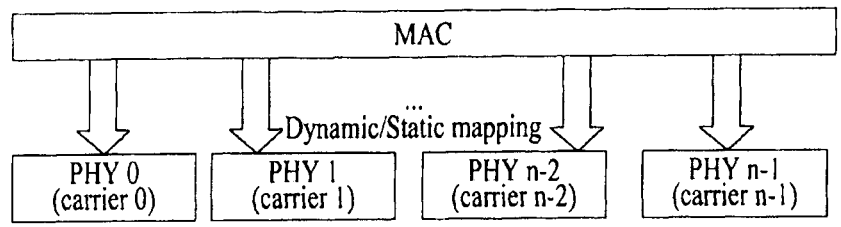
FIG. 23 illustrates the concept that one MAC layer manages multiple carriers in a BS.
Figure 24:
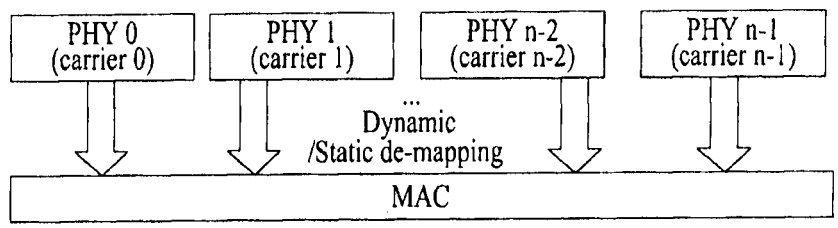
FIG. 24 illustrates the concept that one MAC layer manages multiple carriers in a UE.

FIG. 23 illustrates the concept that one MAC layer manages multiple carriers in a BS and FIG. 24 illustrates the concept that one MAC layer manages multiple carriers in a UE.

Referring to FIGS. 23 and 24, one MAC layer manages one or more frequency carriers so as to perform transmission and reception. Since frequency carriers managed by one MAC layer need not be contiguous, more flexible resource management is possible. In FIGS. 23 and 24, one PHY layer means one CC for convenience. Here, one PHY layer does not necessarily mean an independent radio frequency (RF) device. In general, one independent RF device means one PHY layer, but is not limited thereto. One RF device may include several PHY layers.

Figure 25:
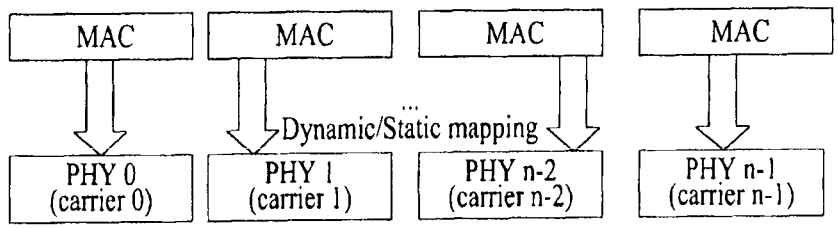
FIG. 25 illustrates the concept that a plurality of MAC layers manages multiple carriers in a BS.
Figure 26:
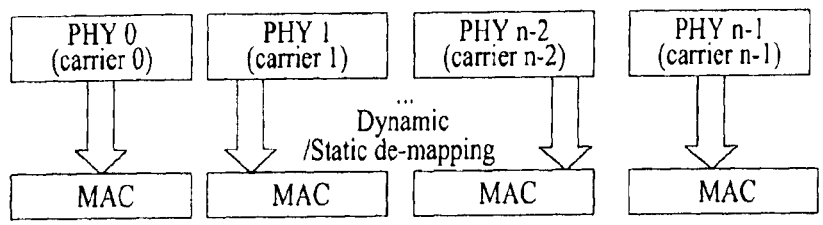
FIG. 26 illustrates the concept that a plurality of MAC layers manages multiple carriers in a UE.
Figure 27:
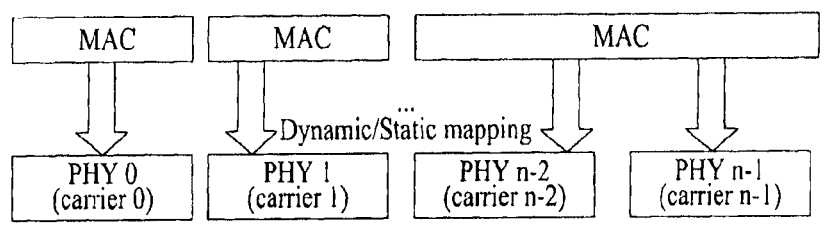
FIG. 27 illustrates the other concept that a plurality of MAC layers manages multiple carriers in a BS.
Figure 28:
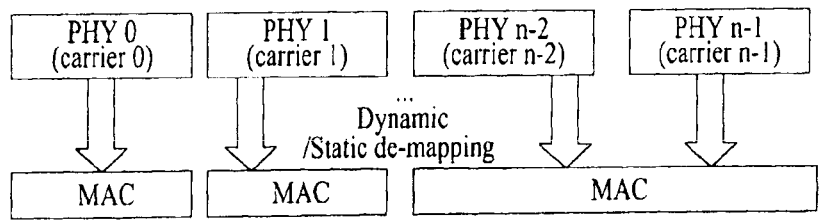
FIG. 28 illustrates the other concept that a plurality of MAC layers manages multiple carriers in a UE.

FIG. 25 illustrates the concept that a plurality of MAC layers manages multiple carriers in a BS and FIG. 26 illustrates the concept that a plurality of MAC layers manages multiple carriers in a UE. FIG. 27 illustrates the other concept that a plurality of MAC layers manages multiple carriers in a BS and FIG. 28 illustrates the other concept that a plurality of MAC layers manages multiple carriers in a UE.

As shown in FIGS. 25 to 28, several MAC layers may control several carriers.

As shown in FIGS. 25 and 26, the MAC layers may control the carriers 1:1. As shown in FIGS. 27 and 28, the MAC layers may control some carriers 1:1 and one MAC layer may control the remaining one or more carriers.

The above system includes a plurality of carriers including 1 carrier to N carriers and the carriers may be contiguously or non-contiguously used, regardless of uplink/downlink. A TDD system is configured to manage N carriers each including downlink and uplink transmission in each carrier and an FDD system is configured to respectively use multiple carriers in uplink and downlink. The FDD system may support asymmetric carrier aggregation in which the numbers of aggregated carriers and/or the bandwidths of carriers in uplink and downlink are different.

3. Uplink Control Information Transmission and Reception Method

In the existing LTE system, the following method is used to allocate PUCCH resources for UL HARQ ACK/NACK feedback of a UE in response to a PDSCH transmitted by a BS.

In an FDD system, in the following case, the UE uses PUCCH resources $n_{PUCCH}^{(1)}$ in order to transmit HARQ ACK in an $n^{th}$ subframe. $n_{PUCCH}^{(1)}$ means a resource index for transmitting a PUCCH.

The UE may use PUCCH resources $n_{PUCCH}^{(1)} = n_{CCE} + N_{PUCCH}^{(1)}$ in order to transmit a PDSCH indicated by detection of a corresponding PDCCH in an $(n-4)^{th}$ subframe. Here, $n_{CCE}$ means the number (smallest CCE index) of a first CCE used to transmit the corresponding DCI assignment and $N_{PUCCH}^{(1)}$ is configured by a higher layer. In addition, if a corresponding PDCCH is not detected in the $(n-4)^{th}$ subframe for transmitting the PDSCH, the value $N_{PUCCH}^{(1)}$ may be determined by higher layer settings.

In the $n^{th}$ subframe having TDD ACK/NACK bundling or TDD ACK/NACK multiplexing and M=1, in the following case, the UE uses PUCCH resources $N_{PUCCH}^{(1)}$ in order to transmit HARQ ACK in the $n^{th}$ subframe. $N_{PUCCH}^{(1)}$ means a resource index for transmitting a PUCCH. In addition, M indicates the number of elements in a set K defined in Table 11.

The UE selects a p value satisfying $N_p \leq n_{CCE} < N_{p+1}$ in {0, 1, 2, 3} in order to transmit the PDSCH indicated by detection of corresponding PDCCH(s) within an $(n-k)^{th}$ subframes and may use PUCCH resources $n_{PUCCH}^{(1)} = (M-m-1) \times N_p + m \times N_{p+1} + n_{CCE} + N_{PUCCH}^{(1)}$. K defined in Table 11 indicates a set $\{k_0, k_1, \ldots k_{M-1}\}$ having M elements according to a UL-DL configuration and an $n^{th}$ subframe and k∈K. In addition, $n_{CCE}$ denotes the number (smallest CCE index) of a first CCE used to transmit the corresponding PDCCH in an $(n-k_m)^{th}$ subframe, $N_{PUCCH}^{(1)}$ is configured by a higher layer, and $N_p = \max\{0, \lfloor [N_{RB}^{DL} \times (N_{sc}^{RB} \times p - 4)]/36 \rfloor\}$. $k_m$ is a smallest value within the K set and indicates that the UE detects a PDCCH in an $(n-k_m)^{th}$ subframe. In addition, if the PDCCH is not detected within the $(n-k)^{th}$ subframe, the $n_{PUCCH}^{(1)}$ value for transmitting the PDSCH may be determined by higher layer setting. Here, K is defined in Table 11 and k∈K.

Table 11 shows a DL association set index K ($\{k_0, k_1, \ldots k_{M-1}\}$) in a TDD system on per UL-DL configuration basis.

TABLE 11

| UL-DL Configuration | \multicolumn{10}{c}{Subframe n} |
|---|---|---|---|---|---|---|---|---|---|---|

| UL-DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | TBD | — | — | — | — | — | — | — |
| 6 | — | — | 7 | 7 | 5 | — | — | 7 | 7 | — |

The PUCCH resources for UL HARQ ACK/NACK feedback by the UE is influenced by $n_{CCE}$ which is a smallest CCE index value for transmission of DCI including PDSCH transmission resource allocation information (DL grant) for the UE in a PDCCH region which is a DL control channel.

However, an enhanced PDCCH (E-PDCCH) which is a new DL control channel for a UE (e.g., Release-11 UE or more) of the LTE-A system is introduced, an UL PUCCH resource mapping rule for PDSCH transmission of the UE which receives DL resource allocation information (DL grant) via an E-PDCCH should be defined. In particular, similarly to a legacy system, a CCE for an E-PDCCH (hereinafter, referred to as an E-CCE in order to be distinguished from a CCE of a legacy PDCCH) is defined and the existing rule for mapping PUCCH resources as a function of a CCE index value for DL grant transmission for PDSCH transmission to a specific UE may be reused. In this case, collision may occur in PUCCH resource mapping with UEs which receive DL grant via a legacy PDCCH according to an E-CCE indexing method of an E-PDCCH. For example, the PUCCH resource mapping rule defined in the FDD/TDD system is reused as a PUCCH resource mapping function for PDSCH transmission with respect to an arbitrary UE set to receive DCI via an E-PDCCH and $n_{E-CCE}$ which is a smallest E-CCE index value among aggregated E-CCEs in which DL grant for the UE is transmitted on an E-PDCCH may be used in place of $n_{CCE}$ which is one of variables of a function for deciding PUCCH resources $n_{PUCCH}^{(1)}$. In this case, if E-CCE indexing is 0 to N−1 (N=the total number of E-CCEs in a DL subframe) independently of CCE indexing of the legacy PDCCH, $n_{CCE}$ and $n_{E-CCE}$ between a UE allocated a PDSCH via DL grant transmitted via a legacy PDCCH and a UE allocated a PDSCH via DL grant transmitted via the E-PDCCH may be the same and, as a result, $n_{PUCCH}^{(1)}$ mapped for UL HARQ ACK/NACK feedback of the two UEs are equally set such that PUCCH resource collision occurs.

Hereinafter, in the present invention, a method of solving PUCCH resource collision which may occur between the UE which receives the DCI via the legacy PDCCH and the UE which receives the DCI via the E-PDCCH if the same PUCCH resource mapping function as the legacy system is used for PUCCH resource mapping to the UE which receives the DL grant via the E-PDCCH.

Here, $n_{E-CCE}$ which is the E-CCE index value applied to PUCCH resource mapping may be a smallest E-CCE index or a largest E-CCE index in which DL grant is transmitted or may be determined by a function of E-CCE indices in which DL grant is transmitted. In addition, an E-CCE indexing rule of an E-PDCCH for applying $n_{E-CCE}$ which is the E-CCE index value applied to the PUCCH resource mapping rule may be newly defined. For example, a virtual resource block (VRB) or physical resource block (PRB) index of a PDSCH according to an E-PDCCH may be reused as an E-CCE index. That is, a smallest or largest resource block (RB) index value which is used for transmitting an E-PDCCH to a specific UE may be applied as $n_{E-CCE}$ and an RB index of a PDSCH may be used as an E-CCE index. However, the present invention is not limited thereto.

3.1. Setting of Offset Value for PUCCH Resource Allocation

In order to prevent collision of a PUCCH resource index $n_{PUCCH}^{(1)}$, a UE which receives DL grant via an E-PDCCH may map PUCCH resources to the existing PUCCH resource mapping function in addition to $n_{offset}$ which is an offset value. That is, for an FDD/TDD system, $n_{PUCCH}^{(1)}$ which is a PUCCH resource index may be determined by Equation 2 and Equation 3.

$$n_{PUCCH}^{(1)} = n_{E-CCE} + N_{PUCCH}^{(1)} + n_{offset} \text{ (in case of the FDD system)} \quad \text{Equation 2}$$

$$n_{PUCCH}^{(1)} = (M-m-1) \times N_p + m \times N_{p+1} + n_{E-CCE} + N_{PUCCH}^{(1)} + n_{offset} \text{ (in case of the TDD system)} \quad \text{Equation 3}$$

Here, the BS may inform the UE of the value $n_{offset}$ as follows.

3.1.1. Direct Transmission of Offset Value

The BS may directly inform the UE of $n_{offset}$ upon PDSCH resource allocation via an E-PDCCH. An information field of k bits for setting $n_{offset}$ in DL grant (DCI format 1 series and DCI format 2 series) transmitted via the E-PDCCH and may be, for example, a "PUCCH resource offset value" field. In addition, in order to inform the UE of $n_{offset}$, information of k bits may be transmitted using the existing information field (e.g., a transmission power control (TPC) command field, etc.).

The UE which receives the "PUCCH resource offset value" of k bits from the BS may apply the received "PUCCH resource offset value", calculate PUCCH resources mapped according to Equation 2 or 3 and transmit UL HARQ ACK/NACK using the calculated PUCCH resources. Here, the range of the value applied as the offset may be changed according to the size of k bits. For example, two offset values of 0 to 1 may be set via values of "0" to "1" in case of k=1, four offset values of 0 to 3 may be set via values of "00" to "11" in case of k=2, and eight offset values of 0 to 7 may be set via values of "000" to "111" in case of k=3. The present invention is not limited thereto and the offset value may be equally set with respect to the k value.

3.1.2. Table Use $n_{offset}$ actually applied to a PUCCH resource mapping function may be mapped according to the "PUCCH resource offset value" of k bits in the form of a table. That is, the "PUCCH resource offset value" of the information field for setting $n_{offset}$ of k bits is not applied as $n_{offset}$ without change and $n_{offset}$ may be determined via the table according to the "PUCCH resource offset value". For example, in case of k=2, $n_{offset}$ of a total of four levels may be set and may be determined as shown in Table 12.

Table 12 shows an example of mapping $n_{offset}$ according to the value of the "PUCCH resource offset value" field.

TABLE 12

| k-bit setting value | $n_{offset}$ value |
|---|---|
| 00 | a |
| 01 | b |
| 10 | c |
| 11 | d |

Referring to Table 12, values a, b, c and d indicating $n_{offset}$ represent arbitrary integer values. For example, a=0, b=1, c=2 and d=3, a=−1, b=0, c=1 and d=2, or a=1, b=1, c=3 and d=5.

As another example, in case of k=3, a value of a total of eight levels may be set and may be determined as shown in Table 13.

Table 13 shows an example of mapping $n_{offset}$ according to the value of the "PUCCH resource offset value" field.

TABLE 13

| k-bit setting value | $n_{offset}$ value |
|---|---|
| 000 | a |
| 001 | b |
| 010 | c |
| 011 | d |
| 100 | e |
| 101 | f |
| 110 | g |
| 111 | H |

Referring to Table 13, similarly to Table 12, values a, b, c, d, e, f, g and h represent arbitrary integer values. For example, a=0, b=1, c=2, d=3, e=4, f=5, g=6 and h=7, a=−3, b=−2, c=−1, d=0, e=1, f=2, g=3 and h=4.

Although a description is made in case where k is 2 or 3 in the above-described example, another value may be set in consideration of the number of values to be set as $n_{offset}$ and overhead of DL grant DCI. At this time, $n_{offset}$ corresponding to the k value may be variously set according to the above-described table mapping method. The UE may set $n_{offset}$ corresponding to the k value signaled via DL grant and determine UL PUCCH resources.

3.2. PUCCH Resource Index Value $n_{PUCCH}^{(1)}$ Setting 3.2.1. PUCCH Resource Index Candidate Set A BS may previously allocate a candidate PUCCH resource set to a UE configured to receive DCI via an E-PDCCH via UE-specific higher layer RRC signaling on a per UE basis and signal which PUCCH resources of the candidate PUCCH resource set are used when PDSCH resources are allocated via DL grant. More specifically, the BS allocates a plurality of candidate PUCCH resources, that is, a plurality of $n_{PUCCH}^{(1)}$ values, to UEs, which receive DCI via an E-PDCCH, via UE-specific higher layer signaling. Thereafter, when PDSCH resources are allocated to the UE, the BS may inform the US of which PUCCH resources among the previously allocated candidate PUCCH resources UL HARQ ACK/NACK is transmitted together with resource allocation information via the DL grant. The BS may define an information field of m bits in DL grant (DCI format 1 series and DCI format 2 series). For example, the "PUCCH resource allocation" field may be defined. Here, m which is the size (bit number) of the "PUCCH resource allocation" field included in DL grant may be determined according to the size (or the number) of PUCCH resource candidate set transmitted via UE-specific higher layer signaling. That is, if the size (or the number) of the candidate set is N, m which is the size of the "PUCCH resource allocation" field may be set to $\lfloor \log_2 N \rfloor$ bits. Here, $\lfloor K \rfloor$ is a minimum integer of k or more.

3.2.2. PUCCH Resource Index Value Transmission

The BS signals the $n_{PUCCH}^{(1)}$ value to the UE and the UE may interpret and apply the value received from the BS to a PUCCH resource number without change. That is, the UE may feed HARQ ACK/NACK back to the BS using the PUCCH resource index received from the BS. In addition, if a set of PUCCH resource numbers is previously configured between the BS and the US and then the BS transmits information about the PUCCH resource index $n_{PUCCH}^{(1)}$, the UE may interpret that information about the PUCCH resource index received from the BS indicates a specific PUCCH resource number among PUCCH resource numbers included in the table. That is, the UE feeds HARQ ACK/NACK back to the BS using PUCCH resources indicated by information about the PUCCH resource index received from the BS.

3.3. $n_{PUCCH}^{(1)}$ Value Setting 3.3.1. Candidate Set Use

When a candidate set for the $n_{PUCCH}^{(1)}$ value configured via cell-specific higher layer signaling among variables of the PUCCH resource mapping function of the legacy system is indicated or when PDSCH resources are allocated to the UE in a candidate set known to the BS and the UE, the BS may indicate the $n_{PUCCH}^{(1)}$ value applied to the PUCCH resource mapping function via DL grant.

3.3.2 $N_{PUCCH}^{(2)}$ Definition

Separately from the $n_{PUCCH}^{(1)}$ value transmitted via higher layer signaling for PUCCH resource mapping of the UEs which receive the DCI via the legacy PDCCH by the BS, a $N_{PUCCH}^{(2)}$ for a UE (e.g., a release-11 UE or more) set to receive DCI via an E-PDCCH may be transmitted to the UE via cell-specific or UE-specific higher layer signaling. The UE which receives the $N_{PUCCH}^{(2)}$ value may perform PUCCH resource mapping based on the $N_{PUCCH}^{(2)}$ PUCCH value.

In case of the FDD system, according to the kind of the physical channel for receiving DL grant, the UE which receives the DL grant via a legacy PDCCH transmits UL HARQ ACK/NACK using PUCCH resources $n_{PUCCH}^{(1)}=n_{CCE}+N_{PUCCH}^{(1)}$, but the UE which receives the DL grant via the E-PDCCH may transmit UL ACK/NACK using PUCCH resources $n_{PUCCH}^{(1)}=n_{E\text{-}CCE}+N_{PUCCH}^{(2)}$.

In addition, in case of the TDD system, the UE which receives the DL grant via the legacy PDCCH may transmit UL HARQ ACK/NACK via $n_{PUCCH}^{(1)}=(M-m-1) \times N_p + m \times N_{p+1} + n_{CCE} + N_{PUCCH}^{(1)}$, but the UE which receives the DL grant via the E-PDCCH may transmit UL ACK/NACK via PUCCH resources $n_{PUCCH}^{(1)}=(M-m-1) \times N_p + m \times N_{p+1} + n_{E\text{-}CCE} + N_{PUCCH}^{(2)}$.

4. General Apparatus to which the Present Invention is Applicable

Figure 29:
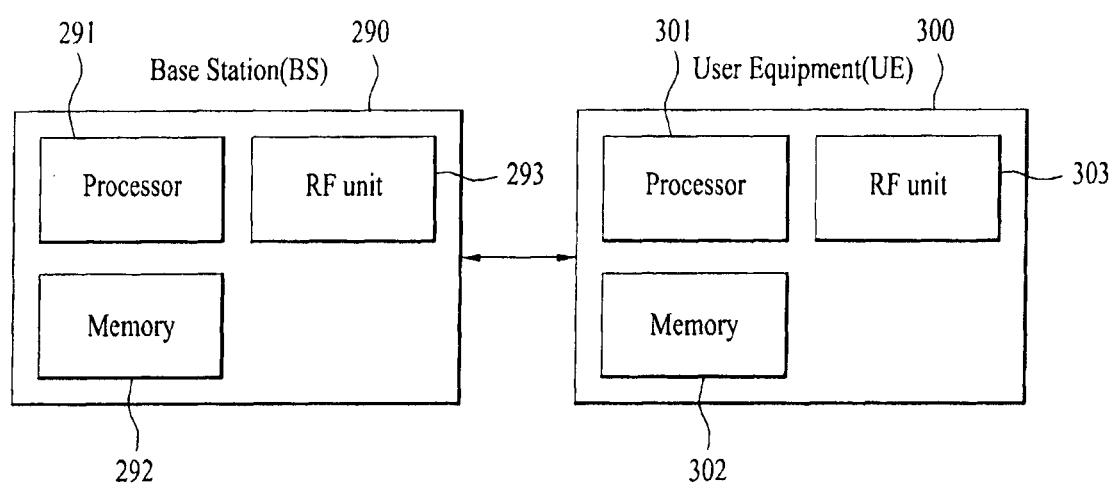
FIG. 29 is a block diagram of a wireless communication apparatus according to an embodiment of the present invention.

FIG. 29 is a block diagram of a wireless communication apparatus according to an embodiment of the present invention.

Referring to FIG. 29, the wireless communication system includes a BS 290 and a plurality of UEs 300 located in the area of the BS 290.

The BS 290 includes a processor 291, a memory 292 and a radio frequency (RF) unit 293. The processor 291 implements the proposed function, process and/or method. Layers of a radio interface protocol may be implemented by the processor 291. The memory 292 is connected to the processor 291 and stores a variety of information for operating the processor 291. The RF unit 293 is connected to the processor 291 and transmits and/or receives a radio signal.

The UE 300 includes a processor 301, a memory 302 and an RF unit 303. The processor 301 implements the proposed function, process and/or method. Layers of a radio interface protocol may be implemented by the processor 301. The memory 302 is connected to the processor 301 and stores a variety of information for operating the processor 301. The RF unit 303 is connected to the processor 301 and transmits and/or receives a radio signal.

The memories 292 and 302 may be located inside or outside the processors 291 and 301 and may be connected to the processors 291 and 301 using a variety of well-known means, respectively. In addition, the BS 290 and/or the UE 300 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention can be implemented by a variety of means, for example, hardware, firmware, software, or a combination of them. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

MODE FOR INVENTION

Various embodiments have been described in the best mode for carrying out the invention.

INDUSTRIAL APPLICABILITY

Although an example of applying a data transmission/reception method to a 3GPP LTE system in a radio access system of the present invention is described, the present invention is applicable to various radio access systems in addition to the 3GPP LTE system.

The invention claimed is:

1. A method of receiving uplink control information (UCI) by a base station in a wireless communication system operating in time division duplex (TDD) and supporting an enhanced physical downlink control channel (e-PDCCH) transmitted in a state of being multiplexed with a physical downlink shared channel (PDSCH), the method comprising:
   transmitting, by the base station to a user equipment via the e-PDCCH, downlink control information (DCI) including offset information for determining resources for transmitting a physical uplink control channel (PUCCH); and
   receiving, by the base station from the user equipment, the UCI using uplink resources according to a resource index value for transmitting the PUCCH,
   wherein the resource index value is calculated using the following equation:

$$n_{PUCCH}^{(1)} = ((M-m-1)*N_p) + (m*N_{p+1}) + n_{E\text{-}CCE} + N_{PUCCH}^{(1)} + n_{offset}$$

wherein M is a number of elements in a set K,
   m is an index of a smallest element within the set K,
   $N_p$ and $N_{p+1}$ are obtained based on p such as to satisfy $N_p \leq n_{E\text{-}CCE} \leq N_{p+1}$,
   p is one of 0, 1, 2, or 3,
   $n_{E\text{-}CCE}$ is a smallest resource block index value of a control channel element (CCE) of the e-PDCCH, wherein resource block index values of the PDSCH are resource block index values of the CCE of the e-PDCCH,
   $N_{PUCCH}^{(1)}$ is configured by a higher layer, and
   $n_{offset}$ is a value of the offset information included in the DCI transmitted via the e-PDCCH, and
   wherein the set K is defined as $\{k_0, k_1, \ldots k_{m-1}\}$ according to an uplink-downlink (UL-DL) configuration configured for the user equipment based on a following table:

| UL/DL | Subframe n | | | | | | | | | |
|---|---|---|---|---|---|---|---|---|---|---|
| Config. | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | | 4 |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 6 | | | 7 | 7 | 5 | | | 7 | | 7 | where the subframe n corresponds to a subframe in which the UCI is received.

2. The method according to claim 1, wherein the resource index value is calculated by applying the value of the offset information to a PUCCH resource mapping function in a predetermined table.

3. The method according to claim 1, wherein the DCI includes a PUCCH resource offset value field and the offset information is indicated via the PUCCH resource offset value field.

4. The method according to claim 1, wherein the DCI includes a transmission power control (TPC) command field and the offset information is indicated via the TPC command field.

5. The method according to claim 1, wherein the uplink control information is hybrid automatic repeat and request acknowledgement (HARQ ACK)/negative ACK (NACK).

6. A method of transmitting uplink control information (UCI) by a user equipment in a wireless communication system operating in time division duplex (TDD) and supporting an enhanced physical downlink control channel (e-PDCCH) transmitted in a state of being multiplexed with a physical downlink shared channel (PDSCH), the method comprising:

receiving, by the user equipment from a base station via the e-PDCCH, downlink control information (DCI) including offset information for determining resources for transmitting a physical uplink control channel (PUCCH);

calculating, by the user equipment, a resource index value for transmitting the PUCCH; and transmitting, by the user equipment to the base station, the UCI using uplink resources according to the resource index value, wherein the resource index value is calculated using the following equation:

$$n_{PUCCH}^{(1)} = ((M-m-1)*N_P) + (m*N_{p+1}) + n_{E\text{-}CCE} + N_{PUCCH}^{(1)} + n_{offset}$$

wherein M is a number of elements in a set K, m is an index of a smallest element within the set K, $N_p$ and $N_{p+1}$ are obtained based on p such as to satisfy $N_p \leq n_{E\text{-}CCE} \leq N_{p+1}$, p is one of 0, 1, 2, or 3, $n_{E\text{-}CCE}$ is a smallest resource block index value of a control channel element (CCE) of the e-PDCCH, wherein resource block index values of the PDSCH are resource block index values of the CCE of the e-PDCCH, $N_{PUCCH}^{(1)}$ is configured by a higher layer, and $n_{offset}$ is a value of the offset information included in the DCI transmitted via the e-PDCCH, and wherein the set K is defined as $\{k_0, k_1, \ldots k_{m-1}\}$ according to an uplink-downlink (UL-DL) configuration configured for the user equipment based on a following table:

| UL/DL Config. | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | | | 4 | | | 6 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 6 | | | 7 | 7 | 5 | | | 7 | | 7 | where the subframe n corresponds to a subframe in which the UCI is received.

7. The method according to claim 6, wherein the resource index value is calculated by applying the value of the offset information to a PUCCH resource mapping function in a predetermined table.

8. The method according to claim 6, wherein the DCI includes a PUCCH resource offset value field and the offset information is indicated via the PUCCH resource offset value field.

9. The method according to claim 6, wherein the DCI includes a transmission power control (TPC) command field and the offset information is indicated via the TPC command field.

10. The method according to claim 6, wherein the uplink control information is hybrid automatic repeat and request acknowledgement (HARQ ACK)/negative ACK (NACK).

11. A base station for receiving uplink control information (UCI) in a wireless communication system operating in time division duplex (TDD) and supporting an enhanced physical downlink control channel (e-PDCCH) transmitted in a state of being multiplexed with a physical downlink shared channel (PDSCH), the base station comprising:

a radio frequency (RF) unit configured to transmit and receive a radio signal; and a processor configured to transmit, via the e-PDCCH, downlink control information (DCI) including offset information for determining resources for transmitting a physical uplink control channel (PUCCH) and to receive the UCI using uplink resources according to a resource index value for transmitting the PUCCH, wherein the resource index value is calculated using the following equation:

$$n_{PUCCH}^{(1)} = ((M-m-1)*N_P) + (m*N_{p+1}) + n_{E\text{-}CCE} + N_{PUCCH}^{(1)} + n_{offset}$$

wherein M is a number of elements in a set K, m is an index of a smallest element within the set K, $N_p$ and $N_{p+1}$ are obtained based on p such as to satisfy $N_p \leq n_{E\text{-}CCE} \leq N_{p+1}$, p is one of 0, 1, 2, or 3, $n_{E\text{-}CCE}$ is a smallest resource block index value of a control channel element (CCE) of the e-PDCCH, wherein resource block index values of the PDSCH are resource block index values of the CCE of the e-PDCCH, $N_{PUCCH}^{(1)}$ is configured by a higher layer, and $n_{offset}$ is a value of the offset information included in the DCI transmitted via the e-PDCCH, and wherein the set K is defined as $\{k_0, k_1, \ldots k_{m-1}\}$ according to an uplink-downlink (UL-DL) configuration configured for the user equipment based on a following table:

| UL/DL Config. | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | | | 4 | | | 6 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 6 | | | 7 | 7 | 5 | | | 7 | | 7 | where the subframe n corresponds to a subframe in which the UCI is received.

12. The base station according to claim 11, wherein the resource index value is calculated by applying the value of the offset information to a PUCCH resource mapping function in a predetermined table.

13. The base station according to claim 11, wherein the DCI includes a PUCCH resource offset value field and the offset information is indicated via the PUCCH resource offset value field.

14. The base station according to claim 11, wherein the DCI includes a transmission power control (TPC) command field and the offset information is indicated via the TPC command field.

15. The base station according to claim 11, wherein the uplink control information is hybrid automatic repeat and request acknowledgement (HARQ ACK)/negative ACK (NACK).

16. A user equipment for transmitting uplink control information (UCI) in a wireless communication system operating in time division duplex (TDD) and supporting an enhanced physical downlink control channel (e-PDCCH) transmitted in a state of being multiplexed with a physical downlink shared channel (PDSCH), the user equipment comprising:
a radio frequency (RF) unit configured to transmit and receive a radio signal; and
a processor configured to receive, via the e-PDCCH, downlink control information (DCI) including offset information for determining resources for transmitting a physical uplink control channel (PUCCH) to calculate a resource index value for transmitting the PUCCH, and to transmit the UCI using uplink resources according to the resource index value,
wherein the resource index value is calculated using the following equation:

$$n_{PUCCH}^{(1)} = ((M-m-1)*N_p) + (m*N_{p+1}) + n_{E\text{-}CCE} + N_{PUCCH}^{(1)} + n_{offset}$$

wherein M is a number of elements in a set K,
m is an index of a smallest element within the set K,
$N_p$ and $N_{p+1}$ are obtained based on p such as to satisfy $N_p \leq n_{E\text{-}CCE} \leq N_{p+1}$,
p is one of 0, 1, 2, or 3,
$n_{E\text{-}CCE}$ is a smallest resource block index value of a control channel element (CCE) of the e-PDCCH, wherein resource block index values of the PDSCH are resource block index values of the CCE of the e-PDCCH,
$N_{PUCCH}^{(1)}$ is configured by a higher layer, and
$n_{offset}$ is a value of the offset information included in the DCI transmitted via the e-PDCCH, and
wherein the set K is defined as $\{k_0, k_1, \ldots k_{m-1}\}$ according to an uplink-downlink (UL-DL) configuration configured for the user equipment based on a following table:

| UL/DL Config. | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | | 4 |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7 | 11 | 6, 5, 4, 7 | | | | | |
| 6 | | | 7 | 7 | | 5 | | 7 | | 7 | where the subframe n corresponds to a subframe in which the UCI is received.

17. The user equipment according to claim 16, wherein the resource index value is calculated by applying the value of the offset information to a PUCCH resource mapping function in a predetermined table.

18. The user equipment according to claim 16, wherein the DCI includes a PUCCH resource offset value field and the offset information is indicated via the PUCCH resource offset value field.

19. The user equipment according to claim 16, wherein the DCI includes a transmission power control (TPC) command field and the offset information is indicated via the TPC command field.

20. The user equipment according to claim 16, wherein the uplink control information is hybrid automatic repeat and request acknowledgement (HARQ ACK)/negative ACK (NACK).

* * * * *